(12) United States Patent
Wakabayashi et al.

(10) Patent No.: US 12,528,015 B2
(45) Date of Patent: Jan. 20, 2026

(54) INFORMATION PROCESSING APPARATUS, INFORMATION PROCESSING METHOD, AND DRIVING DATA GENERATION METHOD

(71) Applicant: Sony Interactive Entertainment Inc., Tokyo (JP)

(72) Inventors: Makoto Wakabayashi, Tokyo (JP); Hideki Mori, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 262 days.

(21) Appl. No.: 18/577,883

(22) PCT Filed: Jul. 12, 2022

(86) PCT No.: PCT/JP2022/027378
§ 371 (c)(1),
(2) Date: Jan. 9, 2024

(87) PCT Pub. No.: WO2023/286761
PCT Pub. Date: Jan. 19, 2023

(65) Prior Publication Data
US 2024/0252924 A1    Aug. 1, 2024

(30) Foreign Application Priority Data

Jul. 14, 2021    (WO) ................. PCT/JP2021/026415

(51) Int. Cl.
*G06Q 20/00*    (2012.01)
*A63F 13/24*    (2014.01)
(Continued)

(52) U.S. Cl.
CPC .............. *A63F 13/55* (2014.09); *A63F 13/24* (2014.09); *A63F 13/285* (2014.09); *G06T 19/20* (2013.01); *G06T 2219/2004* (2013.01)

(58) Field of Classification Search
CPC ........ A63F 13/55; A63F 13/24; A63F 13/285; A63F 13/211; A63F 13/235; G06T 19/20; G06T 2219/2004; G06F 3/01
(Continued)

(56) References Cited

U.S. PATENT DOCUMENTS

| 8,698,736 | B2 | 4/2014 | Birnbaum |
| 2010/0245232 | A1 | 9/2010 | Birnbaum |
| 2015/0331576 | A1* | 11/2015 | Piya .................... G06F 3/04815 715/850 |

FOREIGN PATENT DOCUMENTS

| JP | 2000200140 A | 7/2000 |
| JP | 2009294844 A | 12/2009 |

(Continued)

OTHER PUBLICATIONS

International Search Report for corresponding PCT Application No. PCT/JP2022/027378, 5 pages, dated Sep. 13, 2022.

(Continued)

*Primary Examiner* — Dante Ravetti
(74) *Attorney, Agent, or Firm* — Kilpatrick Townsend & Stockton LLP

(57) ABSTRACT

An operation information acquisition section acquires operation information indicating movement of an operation apparatus being held by a user's hand. The operation apparatus includes a kinesthetic sense presentation section that presents a kinesthetic sense to the user's hand and a tactile sense presentation section that presents a tactile sense to the user's hand. A control section controls movement of a virtual device corresponding to the operation apparatus in a space where a virtual object exists, according to the operation information. The control section generates first driving data for driving the kinesthetic sense presentation section and second driving data for driving the tactile sense presentation (Continued)

section, on the basis of a relation between the virtual device and the virtual object.

13 Claims, 30 Drawing Sheets

(51) Int. Cl.
  *A63F 13/285* (2014.01)
  *A63F 13/55* (2014.01)
  *G06T 19/20* (2011.01)
(58) Field of Classification Search
  USPC .......................... 705/16, 21, 59; 380/44, 262
  See application file for complete search history.

(56) References Cited

FOREIGN PATENT DOCUMENTS

| JP | 2010225155 A | 10/2010 |
|---|---|---|
| JP | 20100287221 A | 12/2010 |
| JP | 2017123039 A | 7/2017 |
| JP | 2019106102 A | 6/2019 |
| JP | 2020194465 A | 12/2020 |
| WO | 2018030266 A1 | 2/2018 |
| WO | 2019225170 A1 | 11/2019 |

OTHER PUBLICATIONS

Masashi Konyo, et al., "A Display Method of Artificial Tactile Sensation Using Amplitude Modulation of Ultrasound Vibration," Pre-Prints CD-ROM of the 24th Annual Conference of the Robotics Society of Japan, 9 pages, dated Sep. 14, 2006. (For relevancy, see English abstract and Non-Pat. Lit. #1 and 4).

Yota Odaka; et al., "VibraPen: a high Frequency Vibro-tactile Feedback Stylus with Simplified Interface" Proceeding of IPSJ Interaction 2015, pp. 735-736, dated Feb. 26, 2015. (For relevancy, see English abstract and Non-Pat. Lit. #1).

International Search Report for corresponding PCT Application No. PCT/JP2021/026415, 6 pages, dated Oct. 5, 2021.

\* cited by examiner

F I G . 3
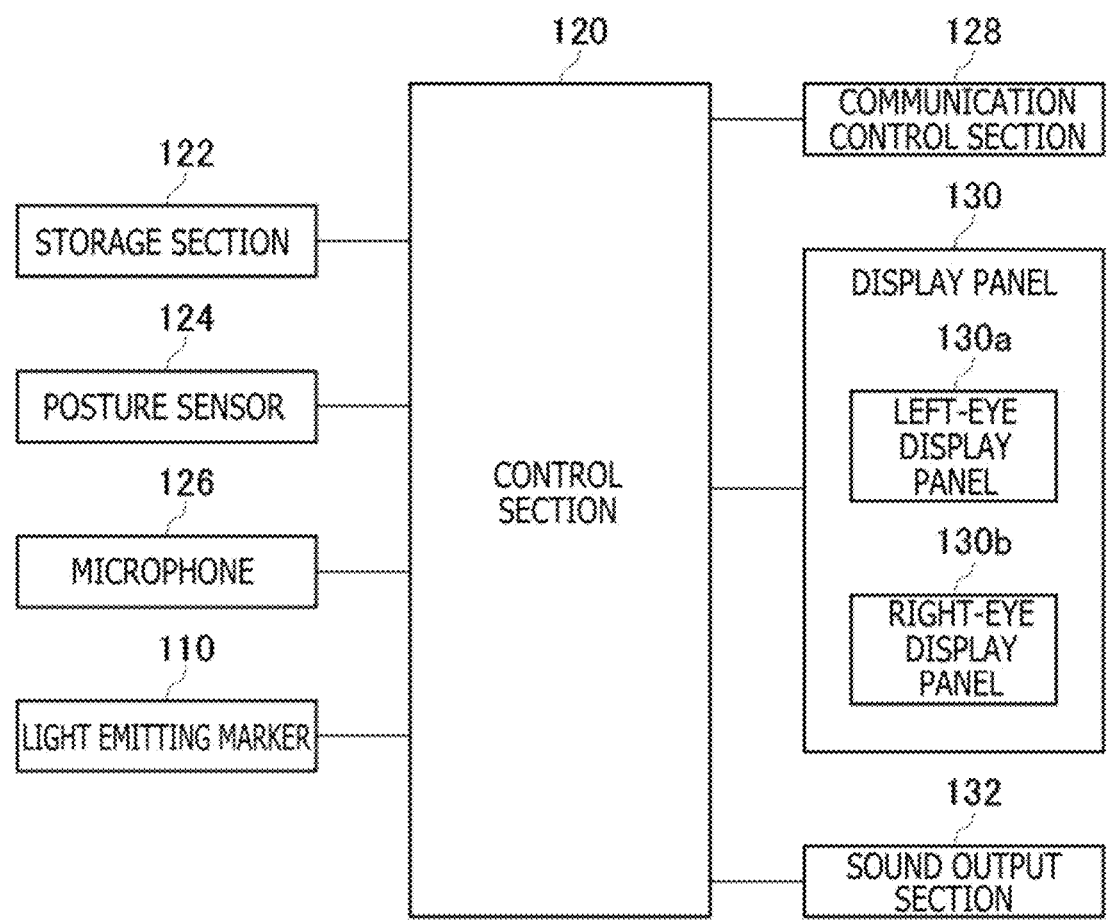

FIG.5
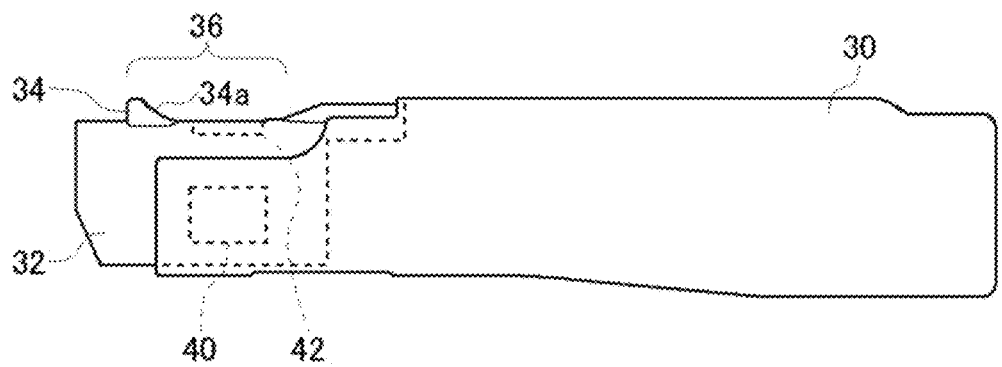
FIG.6
(a)
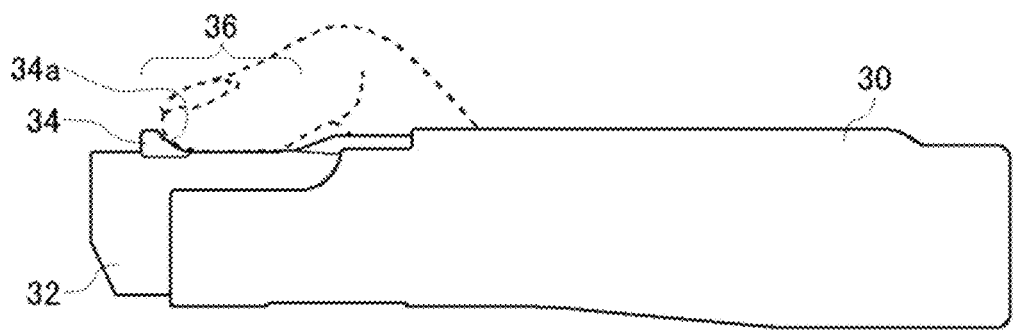
(b) 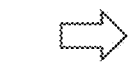 MOVING DIRECTION
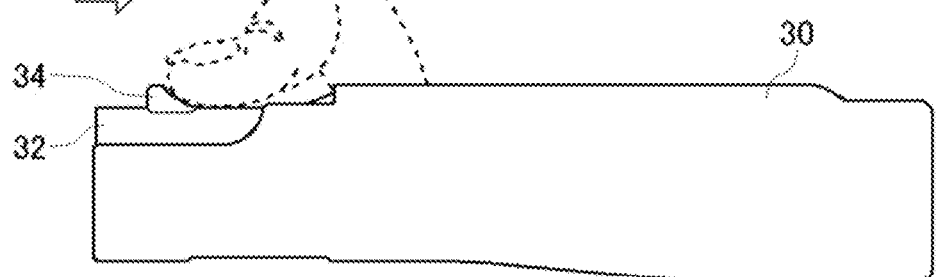

FIG.12
(a)
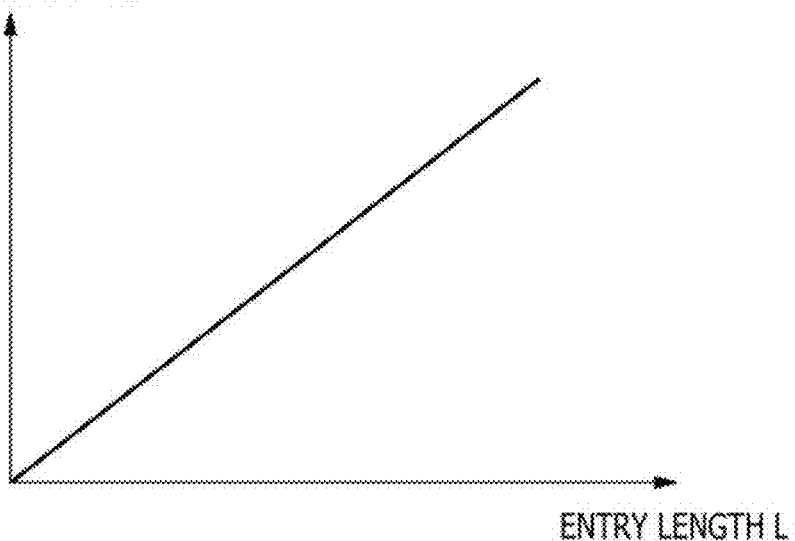
252
(b)
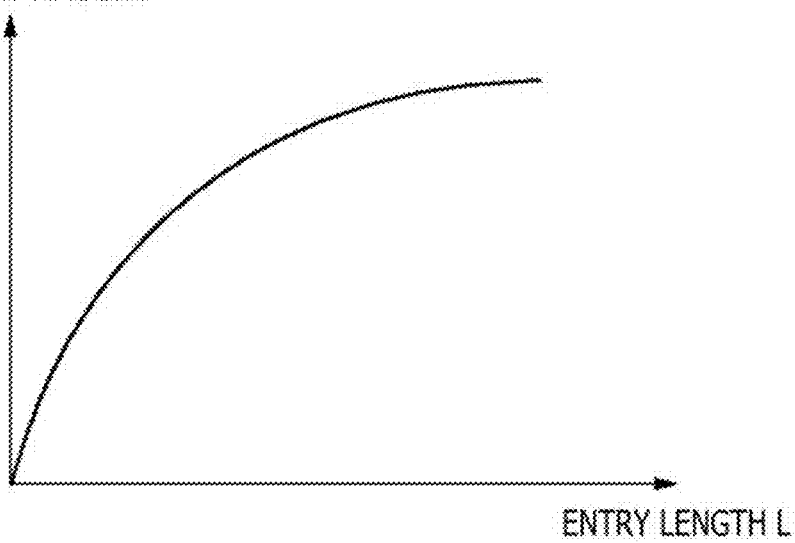
252

FIG.14
(a)
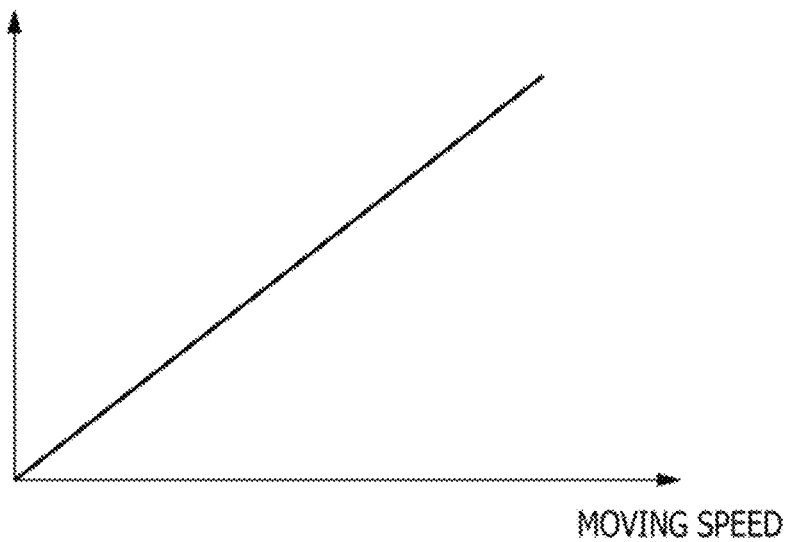
252
(b)
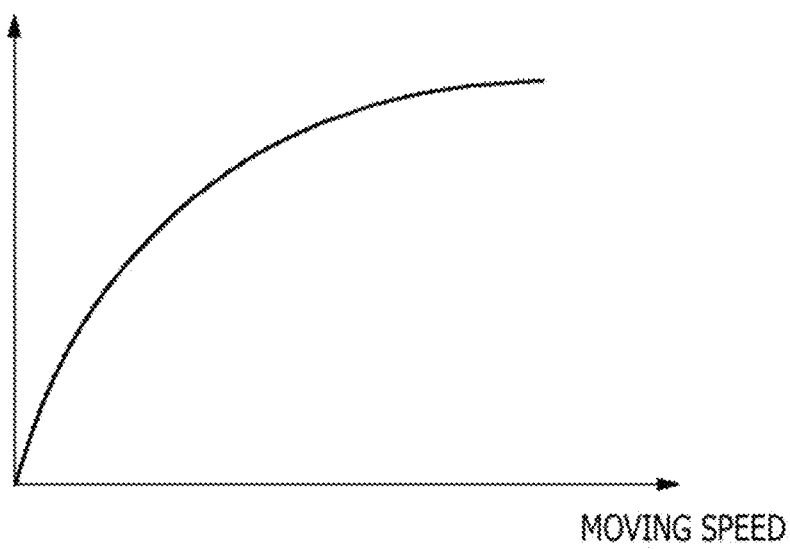
252

252

254

INFORMATION PROCESSING APPARATUS, INFORMATION PROCESSING METHOD, AND DRIVING DATA GENERATION METHOD

TECHNICAL FIELD

The present invention relates to a technology for providing kinesthetic feedback and/or tactile feedback to a user.

Background Art

PTL 1 discloses a portable computer interface equipped with a casing, a mass body that is coupled to the casing, and an actuator that is coupled to the mass body in order to change the position of the mass body with respect to the casing. The portable computer interface disclosed in PTL 1 is used as an operation apparatus for a game. The portable computer interface provides feedback to a user by moving the mass body.

CITATION LIST

Patent Literature

[PTL 1] Japanese Patent Laid-Open No. 2010-225155

SUMMARY

Technical Problem

A head mounted display (HMD) provides an image world of virtual reality (VR) to a user when mounted on the user's head. In recent years, it is common that a user plays a game by operating an operation apparatus while watching a game image that is displayed on an HMD connected to a game apparatus.

During a game play, feedback is given from the game to the user through the operation apparatus, so that the user can physically feel a real sensation of a result of a game operation. Accordingly, it is considered that, if kinesthetic feedback and/or tactile feedback is effectively provided to a user, the entertainability of an application such as a game can be enhanced.

The present invention has been made in view of the circumstances described above, and an object thereof is to realize a technology for providing kinesthetic feedback and/or tactile feedback to a user.

Solution to Problem

In order to solve the above problem, an information processing apparatus according to a certain aspect of the present invention includes an operation information acquisition section and a control section. The operation information acquisition section acquires first operation information indicating movement of an operation apparatus that is held by a user's hand and includes a kinesthetic sense presentation section that presents a kinesthetic sense to the user's hand. The control section controls movement of a virtual device corresponding to the operation apparatus in a virtual space according to the first operation information. The control section generates driving data for driving the kinesthetic sense presentation section on the basis of the movement of the virtual device, the operation information acquisition section acquires second operation information indicating that the kinesthetic sense presentation section has been moved by the user's hand, and the control section causes a function corresponding to the second operation information to be executed in the virtual space.

An information processing method according to another aspect of the present invention includes acquiring first operation information indicating movement of an operation apparatus that is held by a user's hand and includes a kinesthetic sense presentation section that presents a kinesthetic sense to the user's hand, controlling movement of a virtual device corresponding to the operation apparatus in a virtual space according to the first operation information, generating driving data for driving the kinesthetic sense presentation section on the basis of the movement of the virtual device, acquiring second operation information indicating that the kinesthetic sense presentation section has been moved by the user's hand, and causing a function corresponding to the second operation information to be executed in the virtual space.

An information processing apparatus according to still another aspect of the present invention includes an operation information acquisition section and a control section. The operation information acquisition section acquires operation information indicating movement of an operation apparatus that is held by a user's hand and includes a kinesthetic sense presentation section that presents a kinesthetic sense to a first finger of the user and a tactile sense presentation section that presents a tactile sense to a second finger of the user. The control section controls movement of a virtual device corresponding to the operation apparatus in a space where a virtual object exists, according to the operation information. The control section generates first driving data for driving the kinesthetic sense presentation section and second driving data for driving the tactile sense presentation section, on the basis of a relation between the virtual device and the virtual object.

A driving data generation method according to yet another aspect of the present invention includes acquiring operation information indicating movement of an operation apparatus that is held by a user's hand and includes a kinesthetic sense presentation section that presents a kinesthetic sense to a first finger of the user and a tactile sense presentation section that presents a tactile sense to a second finger of the user, controlling movement of a virtual device corresponding to the operation apparatus in a space where a virtual object exists, according to the operation information, and generating first driving data for driving the kinesthetic sense presentation section and second driving data for driving the tactile sense presentation section, on the basis of a relation between the virtual device and the virtual object.

It is to be noted that any combinations of the components described above and representations of the present invention where they are converted between a method, an apparatus, a system, and so forth are also effective as aspects of the present invention.

BRIEF DESCRIPTION OF DRAWINGS

FIG. 3 is a diagram illustrating functional blocks of the HMD.

FIG. 5 is a side view of the operation apparatus.

FIG. 6 is a diagram illustrating a situation in which a finger is put on a movable section.

FIG. 12 is a diagram of examples of a map in which a relation between a movement amount of the movable section and an entry length is determined.

FIG. 14 is a diagram of examples of a map in which a relation between a moving speed and a vibration amount of a vibration section is determined.

DESCRIPTION OF EMBODIMENTS

Figure 1:
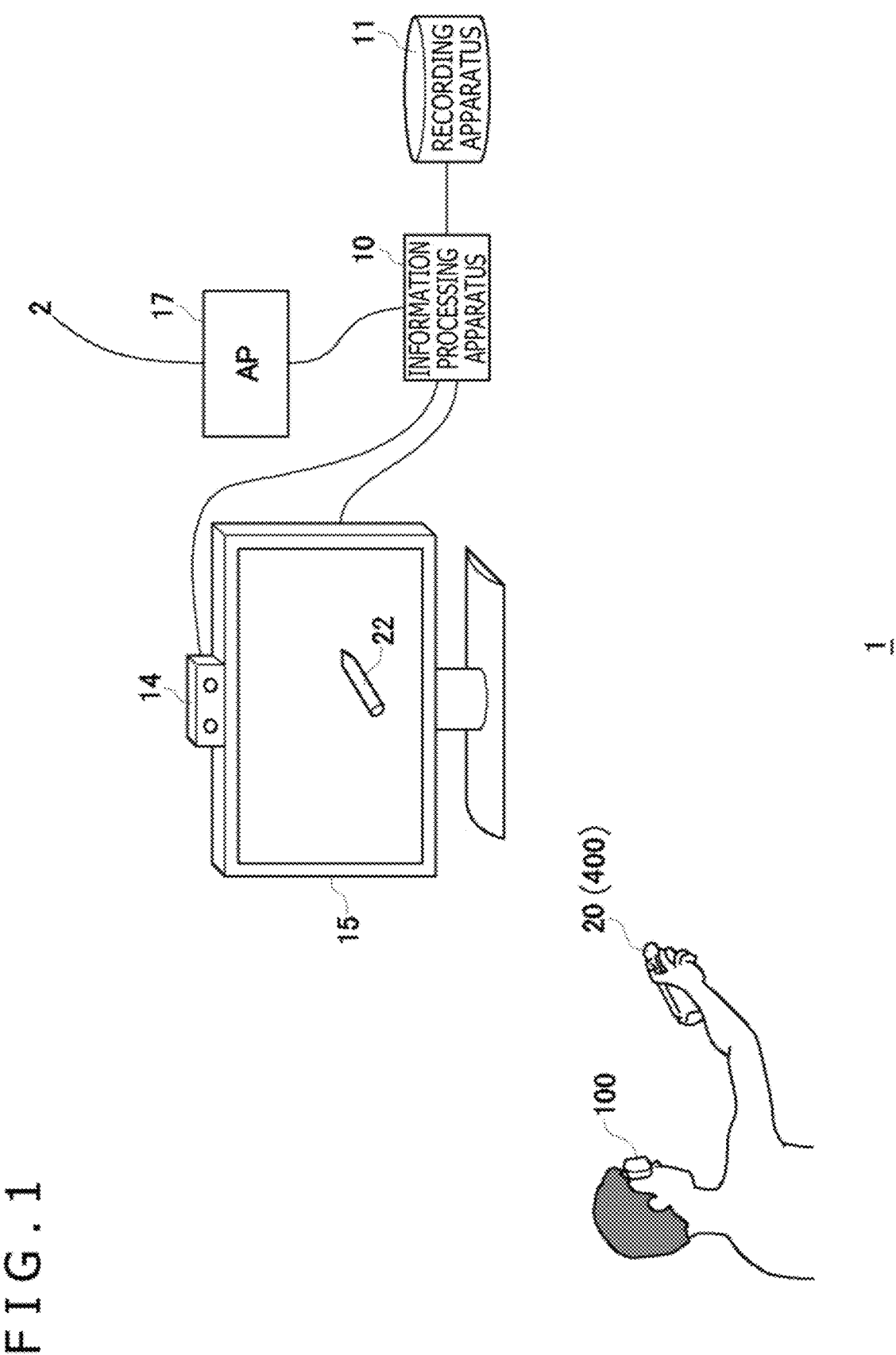
FIG. 1 is a diagram illustrating a configuration example of an information processing system.

FIG. 1 illustrates a configuration example of an information processing system 1 according to an embodiment. The information processing system 1 includes an information processing apparatus 10, a recording apparatus 11, a head mounted display (HMD) 100 that is mounted on a user's head, an operation apparatus 20 that is held by a user's hand, an imaging apparatus 14 that images the HMD 100 and the operation apparatus 20, and an output apparatus 15 that outputs images and sound. The output apparatus 15 may be a television set. The information processing apparatus 10 is connected to an external network 2 such as the internet via an access point (AP) 17. The AP 17 has a wireless access point function and a router function. The information processing apparatus 10 may be connected to the AP 17 via a cable or may be connected to the AP 17 according to a known wireless communication protocol.

In the recording apparatus 11, system software and applications such as game software are recorded. The information processing apparatus 10 may download an application into the recording apparatus 11 from a content server via the network 2. The information processing apparatus 10 executes an application and supplies image data and sound data associated with the application to the HMD 100 and the output apparatus 15. The information processing apparatus 10 and the HMD 100 may be connected to each other according to a known wireless communication protocol or via a cable.

The HMD 100 is a display apparatus that, when mounted on the head of a user, displays an image on a display panel positioned in front of the eyes of the user. The HMD 100 displays a left-eye image on a left-eye display panel and a right-eye image on a right-eye display panel, separately. These images constitute parallax images that are viewed from left and right visual points, thereby realizing a stereoscopic vision. The user watches the display panel through optical lenses. The information processing apparatus 10 supplies parallax image data in which optical distortion caused by the lenses has been corrected, to the HMD 100.

The HMD 100 provides an image world of virtual reality (VR) to a user. A head tracking function is given to the information processing system 1 to update a display image in conjunction with motion of the user's head. As a result, a sense of immersion into the image world is enhanced.

Since the output apparatus 15, which is unnecessary for the user wearing the HMD 100, is prepared, another user can watch a display image on the output apparatus 15. The information processing apparatus 10 may display, on the output apparatus 15, an image same as that the user wearing the HMD 100 is watching, or may display a different image. For example, in a case where the user wearing the HMD plays a game together with another user, a game image from a viewpoint of a character of the other user may be displayed on the output apparatus 15.

The operation apparatus 20 is a controller that is driven by a battery and that has one or more operation buttons for inputting an operation for an application. When the user operates any of the operation buttons of the operation apparatus 20, the operation input is transmitted to the information processing apparatus 10 via wireless communication. Wireless connection using a Bluetooth (registered trademark) protocol, for example, may be established between the operation apparatus 20 and the information processing apparatus 10. The information processing apparatus 10 receives an operation input from the operation apparatus 20, controls the progress of the application in response to the operation input to generate image data and sound data for the application, and supplies the generated data to the HMD 100 and the output apparatus 15. The operation apparatus 20 is not limited to a wireless controller and may be a wired controller that is connected to the information processing apparatus 10 via a cable.

The operation apparatus 20 includes a posture sensor including a triaxial acceleration sensor and a triaxial gyro sensor and transmits sensor data to the information processing apparatus 10 in a predetermined cycle. In a rendering application according to the embodiment, a virtual device 22 corresponding to the operation apparatus 20 is moved in a virtual three-dimensional (3D) space according to movement of the operation apparatus 20 being held by a user's hand. For this purpose, the information processing apparatus 10 derives the position, posture, and/or movement of the operation apparatus 20 on the basis of the sensor data transmitted from the operation apparatus 20 and uses, as operation information for moving the virtual device 22, the derived position, posture, and/or movement of the operation apparatus 20.

The imaging apparatus 14 is a video camera including a charge-coupled device (CCD) imaging element or a complementary metal oxide semiconductor (CMOS) imaging element and generates cycle-based frame images by imaging a real space in a predetermined cycle. The imaging apparatus 14 is a stereo camera, and the information processing apparatus 10 is preferably capable of measuring the distance to an object in reference to a captured image. The imaging speed of the imaging apparatus 14 may be set to 60 images/sec so as to be equal to the frame rate of the HMD 100. The imaging apparatus 14 establishes connection with the information processing apparatus 10 via a universal serial bus (USB) or any other interface.

The HMD 100 is provided with a marker (tracking light-emitting diode (LED)) for tracking the user's head, and the information processing apparatus 10 detects movement of the HMD 100 on the basis of the position of the marker included in a captured image. It is to be noted that posture sensors (triaxial acceleration sensor and triaxial gyro sensor) may be mounted on the HMD 100, and the information processing apparatus 10 may perform high-precision tracking processing by obtaining, from the HMD 100, sensor data detected by the posture sensors while using a captured image of the marker, to thereby detect the position and posture of the user's head (practically, HMD 100) in the real space.

Here, the position of the HMD 100 means position coordinates in a 3D space having an origin at a reference position. The reference position may be at position coordinates (longitude and latitude) obtained when the HMD 100 is powered on. In addition, the posture of the HMD 100 means an inclination in three axial directions with respect to a reference posture in the 3D space. In the reference posture, the visual line direction of the user is horizontal. The reference posture may be set when the HMD 100 is powered on. It is to be noted that a variety of methods have conventionally been proposed for the tracking processing. The information processing apparatus 10 may adopt any of the tracking methods as long as movement of the HMD 100 can be detected.

Figure 2:
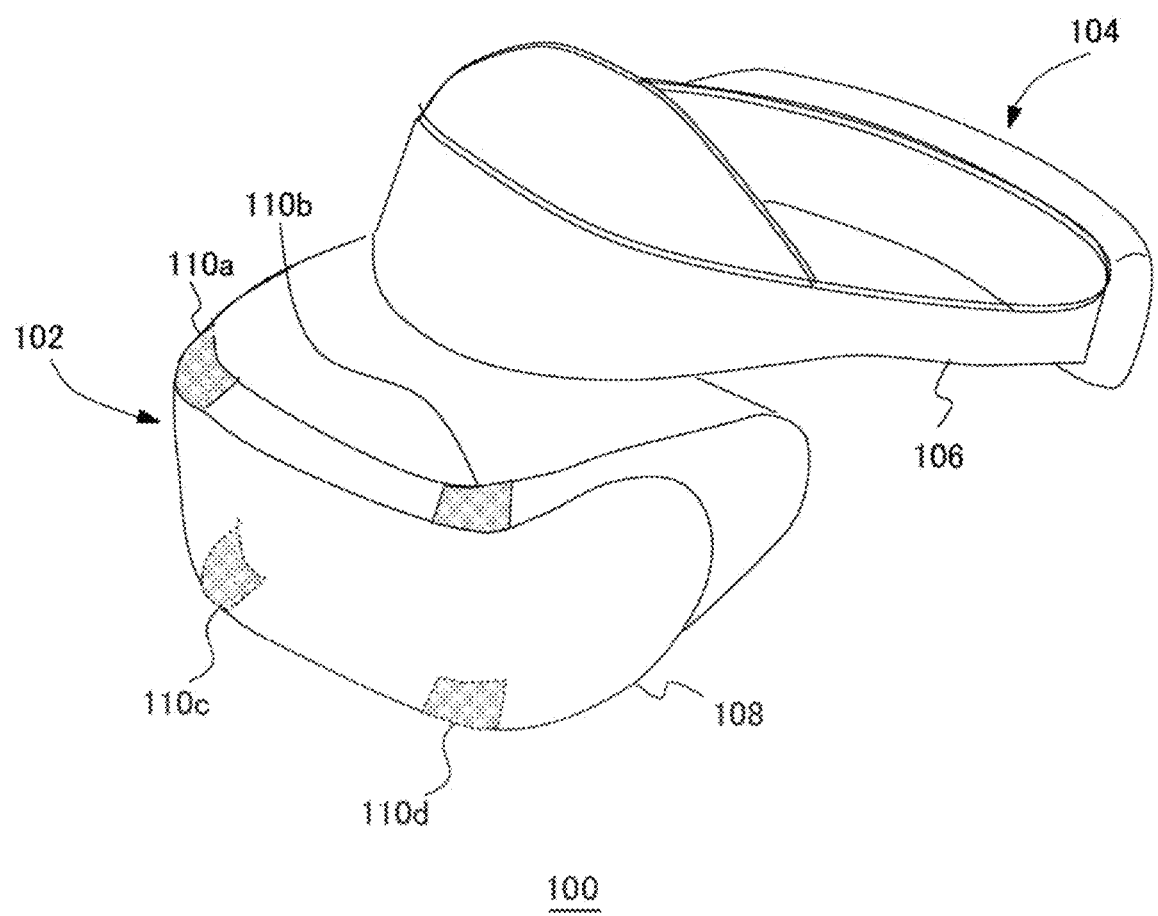
FIG. 2 is a diagram illustrating an example of an appearance of an HMD.

FIG. 2 illustrates an example of an appearance of the HMD 100. The HMD 100 includes an output mechanism part 102 and a fitting mechanism part 104. The fitting mechanism part 104 includes a fitting band 106 that surrounds the head of the user when worn by the user, such that the HMD 100 is fixed to the head. The fitting band 106 has such a material or a structure that the length thereof is adjustable for the head size of the user.

The output mechanism part 102 includes a casing 108 that is shaped to cover the left and right eyes when the user is wearing the HMD 100. A display panel that directly faces the eyes when the user is wearing the HMD 100 is provided in the casing 108. The display panel may be a liquid crystal panel or an organic electroluminescence (EL) panel. Further, a pair of left and right optical lenses that are positioned between the display panel and the user's eyes and that enlarge the viewing angle of the user are provided in the casing 108. The HMD 100 may further include a loudspeaker or an earphone at a position that corresponds to a user's ear, or may be formed to be connected with an external headphone.

A plurality of light emitting markers 110a, 110b, 110c, and 110d are provided on an outer surface of the casing 108. Tracking LEDs constitute the light emitting markers 110 in this example, but any other types of markers may be used. Any markers can be used as long as the markers can be imaged by the imaging apparatus 14 such that the information processing apparatus 10 can perform image analysis for the positions of the markers. The number and positions of the light emitting markers 110 are not limited to any number or any position. It is necessary to determine the number and positions in such a way that the posture of the HMD 100 can be detected. In the illustrated example, the light emitting markers 110 are disposed at four corners on a front surface of the casing 108. The light emitting markers 110 may further be disposed on a side portion and a rear portion of the fitting band 106 such that the light emitting markers 110 can be imaged even when the user turns the user's back to the imaging apparatus 14.

FIG. 3 illustrates functional blocks of the HMD 100. A control section 120 is a main processor that processes commands and various types of data such as image data, sound data, and sensor data and outputs the processed data and commands. A storage section 122 temporarily stores data and commands which are processed by the control section 120. A posture sensor 124 detects posture information associated with the HMD 100. The posture sensor 124 includes at least a triaxial acceleration sensor and a triaxial gyro sensor.

A communication control section 128 transmits data outputted from the control section 120, to the information processing apparatus 10 which is external to the HMD 100, through wired or wireless communication via a network adapter or an antenna. In addition, the communication control section 128 receives data from the information processing apparatus 10 through wired or wireless communication via a network adapter or an antenna and outputs the data to the control section 120.

When receiving image data and sound data from the information processing apparatus 10, the control section 120 supplies the data to a display panel 130 and causes the display panel 130 to display the data, and outputs the data to a sound output section 132 and causes the sound output section 132 to output the data. The display panel 130 includes a left-eye display panel 130a and a right-eye display panel 130b. A pair of parallax images are displayed on the respective display panels. In addition, the control section 120 causes the communication control section 128 to transmit the sensor data obtained by the posture sensor 124 and sound data obtained by a microphone 126 to the information processing apparatus 10.

First Embodiment

Figure 4:
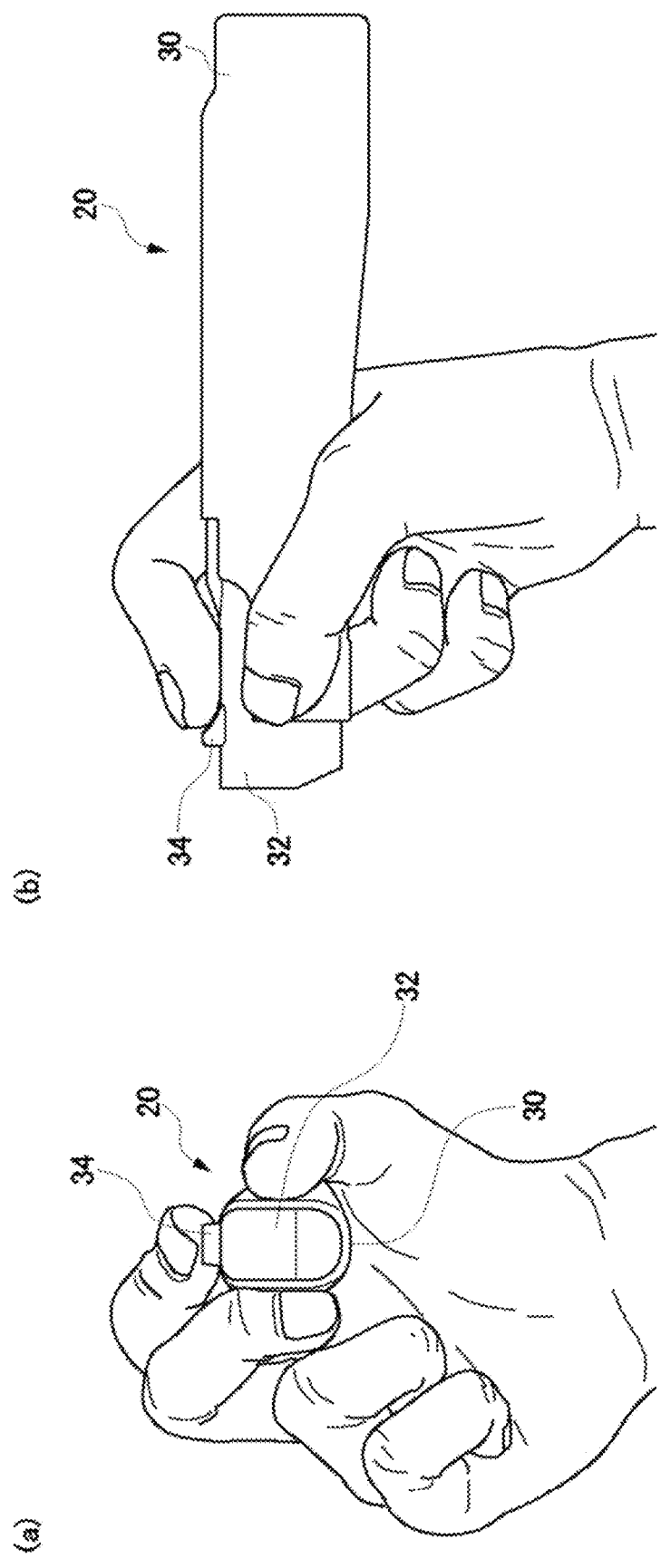
FIG. 4 is a diagram illustrating a situation in which a user is holding an operation apparatus.

FIG. 4 illustrates a situation in which a user is holding the operation apparatus 20 according to a first embodiment. FIG. 4(a) is a front view of the operation apparatus 20, and FIG. 4(b) is a side view of the operation apparatus 20. The operation apparatus 20 includes a base body 30 that is held by a user's hand, and a movable section 32 that is a component movable relative to the base body 30. The movable section 32 functions as a kinesthetic sense presentation section that presents a kinesthetic sense to the user's hand. The movable section 32 is driven in reference to driving data transmitted from the information processing apparatus 10 and provides kinesthetic feedback to the user.

The operation apparatus 20 is a pen-like haptics device. The base body 30 has opposite side surfaces that are substantially parallel to each other. The user uses the operation apparatus 20 with a thumb and a middle finger put on the side surfaces of the base body 30 in such a manner as to sandwich the base body 30 and an index finger put on the movable section 32.

FIG. 5 is a side view of the operation apparatus 20. A side of the operation apparatus 20 on which the movable section 32 is disposed is defined as a tip side, and the left side and the right side of the side view in FIG. 5 are defined as a front side and a rear side, respectively. In the state illustrated in FIG. 5, the movable section 32 is at a position projecting forward maximally from the base body 30. This position is a "reference position" of the movable section 32.

A finger placement section 36 on which the fingertip of the index finger is placed in a state where the user is holding the base body 30 is provided on an upper surface of the movable section 32. A finger engagement section 34 with which a fingertip portion is to engage is provided on a front end of the finger placement section 36. The finger engagement section 34 stands in a direction different from a movement direction (i.e., front-rear direction) of the movable section 32. In the first embodiment, the finger engagement section 34 stands in a direction that is orthogonal to the upper surface of the movable section 32. The finger engagement section 34 has a curved surface 34a that is inclined in such a manner as to be along the pad of a finger and that has a curvature radius. The curved surface 34a is inclined with respect to the upper surface of the movable section 32 and is formed to be recessed in a direction in which contact with a fingertip is made. As a result, the user is allowed to stably put the tip portion of the index finger in contact with the curved surface 34a.

The user puts the thumb and the middle finger on the side surfaces of the base body 30 in such a manner as to sandwich the base body 30 and puts the pad of the index finger on the finger placement section 36, just like holding a pen. Therefore, the user can put the index finger on the finger placement section 36 no matter which hand of the user is dominant. A vibration section 40 including a vibrator is disposed on a tip end portion of the base body 30, or more specifically, on a portion on which the thumb or the middle finger is put. The vibration section 40 may be disposed on both sides of the tip end of the base body 30. The vibration section 40 functions as a tactile sense presentation section that vibrates to present a tactile sense to the user's hand. The vibration section 40 is driven in reference to driving data transmitted from the information processing apparatus 10 and presents tactile feedback to the user.

An operation button 42 that can be operated by the tip of the index finger is disposed in the finger placement section 36. The operation button 42 is a push-type button. By pressing down the operation button 42, the user turns on a switch (not illustrated) having a contact point structure. In the finger placement section 36, the operation button 42 is disposed rearward of the curved surface 34a. Since the operation button 42 is provided in the finger placement section 36, the user is allowed to freely operate the operation button 42 with the index finger while holding the base body 30 with the thumb and the middle finger.

FIG. 6(a) illustrates a situation in which a finger is put on the movable section 32 that is at the reference position. When the user puts the pad of the finger on the finger placement section 36, the tip portion of the finger is fitted to and in contact with the curved surface 34a. Since the tip portion of the finger is in contact with the finger engagement section 34 in this manner, the finger moves together with the finger engagement section 34 without fail when the movable section 32 moves to be drawn into the base body 30.

FIG. 6(b) illustrates a situation in which the movable section 32 is moving in such a direction as to be drawn into the base body 30. When the movable section 32 moves, the tip portion of the finger moves together with the movable section 32 by a frictional force acting between the finger placement section 36 and the tip portion of the finger. The tip portion of the finger moves with movement of the movable section 32 without fail because the tip portion is in contact with the finger engagement section 34 which stands in the direction orthogonal to the moving direction.

Figure 7:
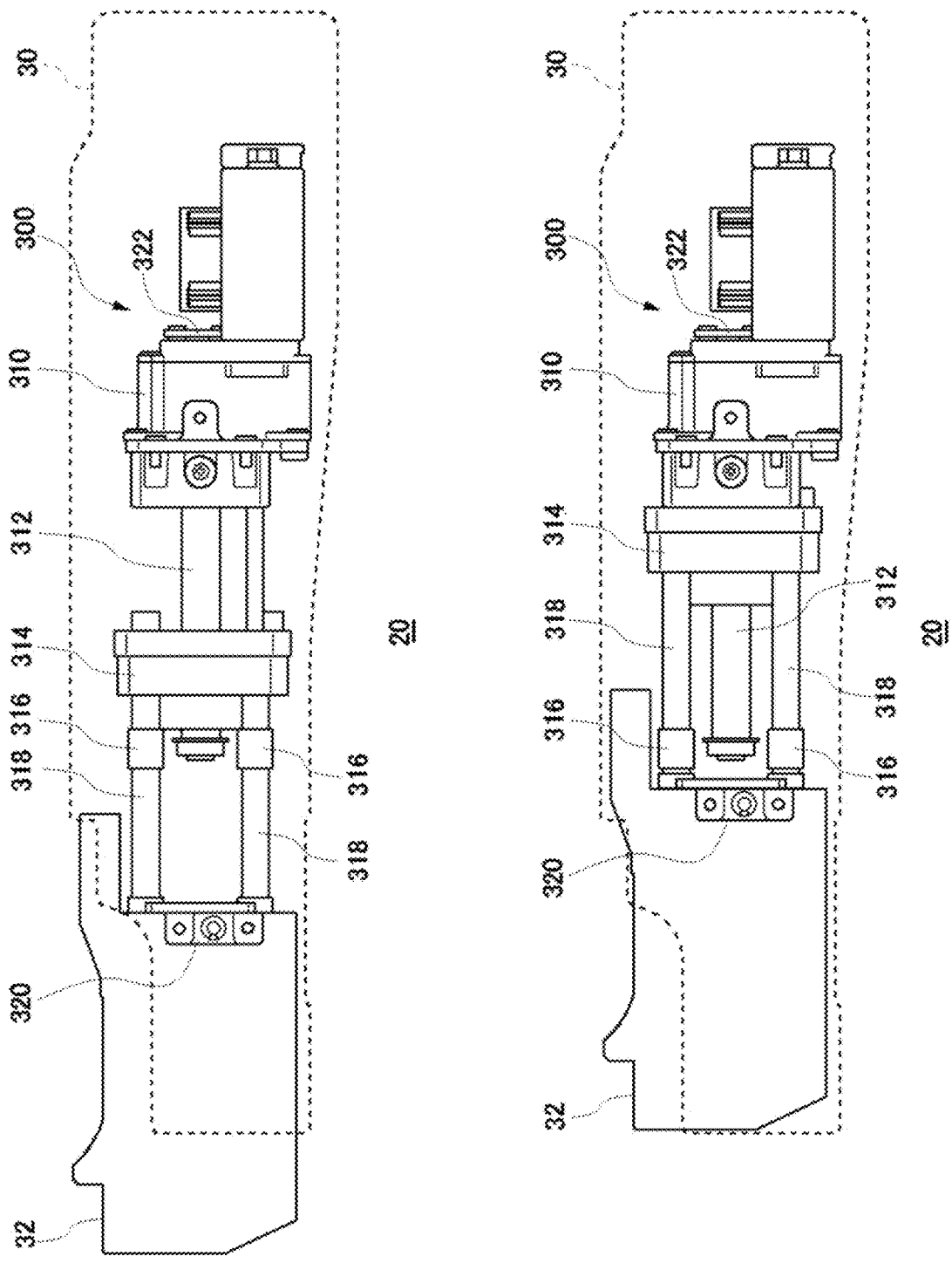
FIG. 7 is a diagram illustrating a movement mechanism that moves the movable section relative to a base body.

FIG. 7 illustrates a movement mechanism 300 for moving the movable section 32 relative to the base body 30. FIG. 7(a) illustrates the movement mechanism 300 in a state where the movable section 32 is at the reference position, and FIG. 7(b) illustrates the movement mechanism 300 in a state where the movable section 32 has been drawn from the reference position.

The movement mechanism 300 includes a first rotary actuator 310, a feed screw 3112, a nut 314, a guide mechanism 316, a rod 318, a fixation section 320, and a first rotational angle sensor 322. The movement mechanism 300 slidingly moves the movable section 32 in a longitudinal direction of the base body 30. In the movement mechanism 300, the first rotary actuator 310 moves the nut 314 in an axial direction of the feed screw 312 (the longitudinal direction of the base body 30) by rotating the feed screw 312 in a normal or reverse direction. A plurality of the rods 318 are fixed to the nut 314. The fixation section 320, which is fixed to a fixed section of the movable section 32, is mounted on tip ends of the rods 318. Movement of the rods 318 in an advancing direction is guided by the guide mechanism 316 which is fixed to an inner wall of the base body 30. The first rotational angle sensor 322 detects a rotational angle of the first rotary actuator 310. Movement of the movable section 32 is controlled on the basis of a detection value obtained by the first rotational angle sensor 322.

Figure 8:
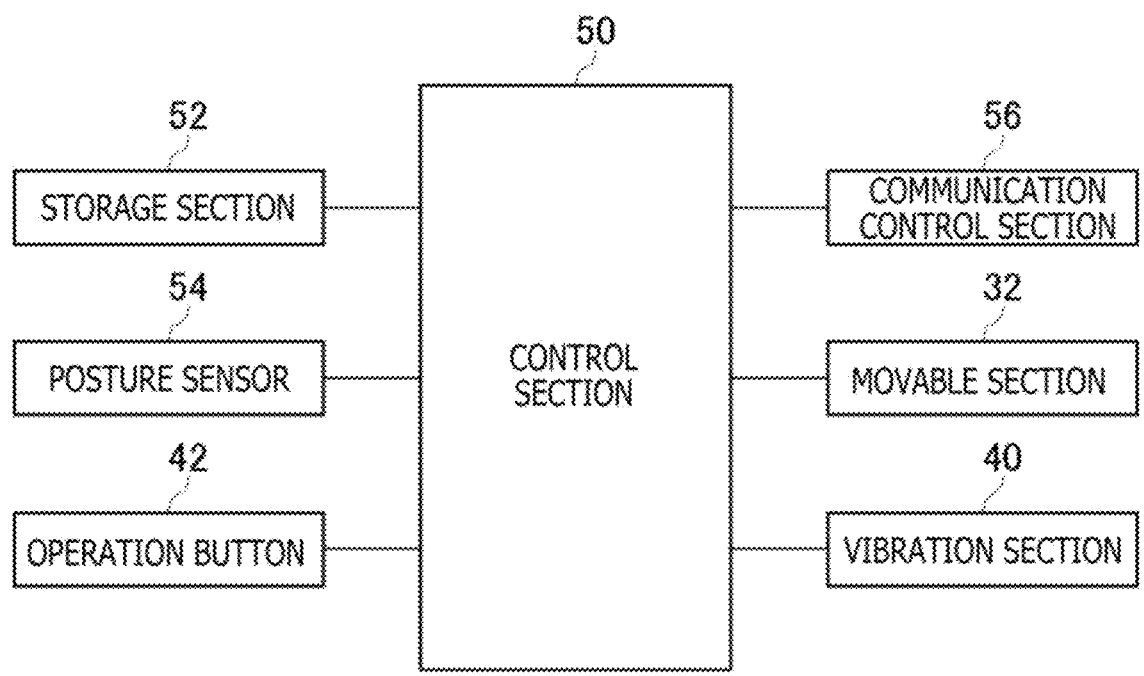
FIG. 8 is a diagram illustrating functional blocks of the operation apparatus.

FIG. 8 illustrates functional blocks of the operation apparatus 20. A control section 50 is a main processor that processes commands and various types of data such as sensor data and driving data and outputs the processed data and commands. A storage section 52 temporarily stores data and commands which are processed by the control section 50. A posture sensor 54 detects posture information associated with the operation apparatus 20. The posture sensor 54 includes at least a triaxial acceleration sensor and a triaxial gyro sensor.

A communication control section 56 transmits the data outputted from the control section 50, to the information processing apparatus 10 which is external to the operation apparatus 20, through wired or wireless communication via a network adapter or an antenna. In addition, the communication control section 56 receives data from the information processing apparatus 10 through wired or wireless communication via a network adapter or an antenna and outputs the data to the control section 50.

When receiving driving data from the information processing apparatus 10, the control section 50 drives the movable section 32 and/or the vibration section 40. In the operation apparatus 20, the movable section 32 is a kinesthetic sense presentation section that presents a kinesthetic sense to the user's hand, while the vibration section 40 is a tactile sense presentation section that presents a tactile sense to the user's hand. The movable section 32 and the vibration section 40 provide kinesthetic feedback and tactile feedback, respectively, so that the user can realistically feel an event occurring in the application. The control section 50 causes the communication control section 56 to transmit the sensor data obtained by the posture sensor 54 to the information processing apparatus 10.

The operation apparatus 20 according to the first embodiment is used as the virtual device 22 that gives off an ink in the rendering application for drawing a picture and a character in a virtual 3D space. On the display panel 130 and the output apparatus 15, the virtual device 22 is displayed as a virtual pen having a pen tip. The tip of the operation apparatus 20 corresponds to the pen tip of the virtual device 22 in this rendering application. When the user moves the operation apparatus 20 in the real space, the virtual device 22 exhibits, in the virtual space, a behavior linked to the operation apparatus 20.

Figure 9:
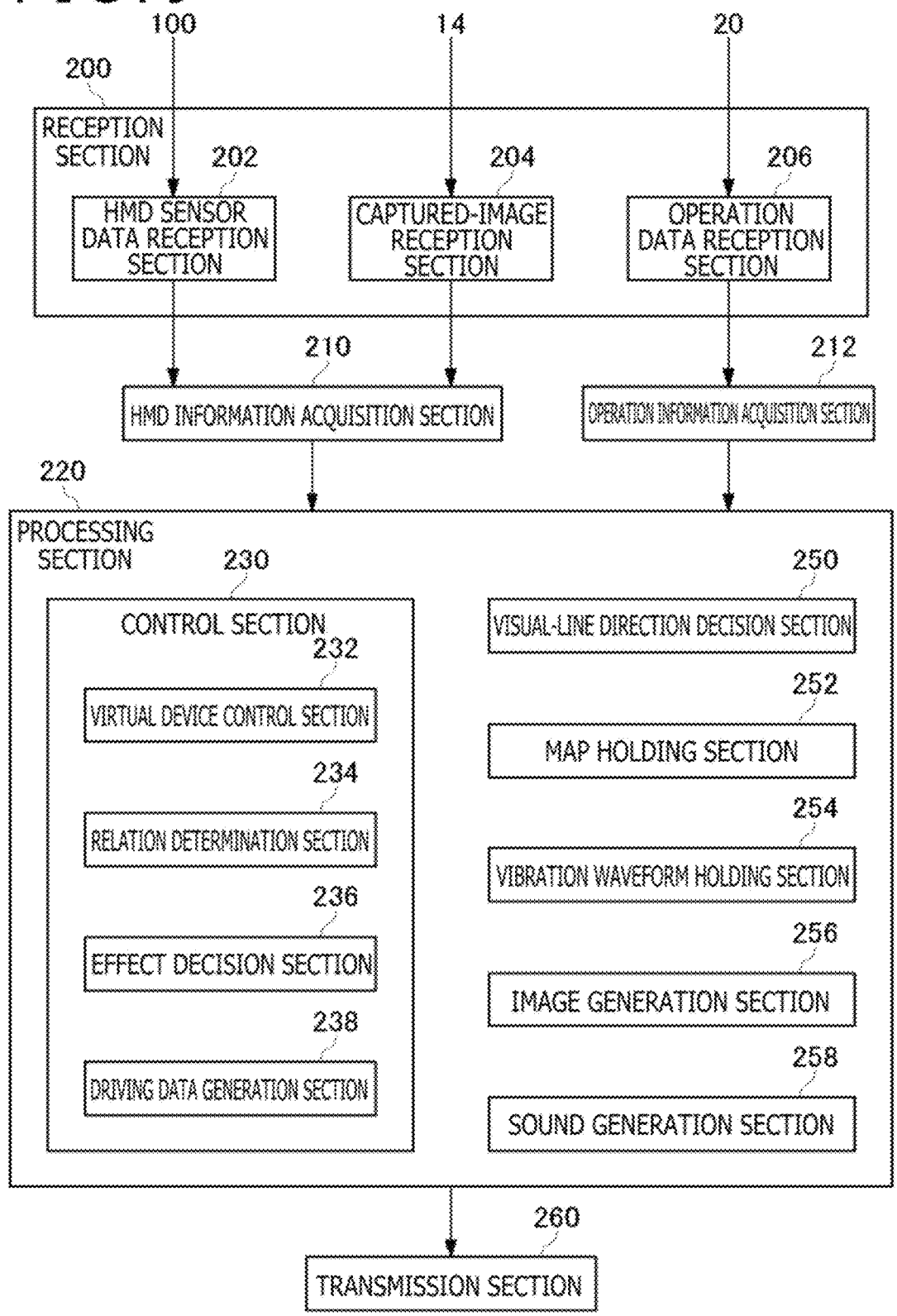
FIG. 9 is a diagram illustrating functional blocks of the information processing apparatus.

FIG. 9 illustrates functional blocks of the information processing apparatus 10. The information processing apparatus 10 includes a reception section 200 and a transmission section 260 which are input/output interfaces to the outside. The information processing apparatus 10 further includes an HMD information acquisition section 210, an operation information acquisition section 212, and a processing section 220.

The information processing apparatus 10 includes a computer. The computer executes a program to implement the various functions illustrated in FIG. 9. The computer includes, as hardware, a memory for loading a program thereinto, one or more processors that execute a loaded program, an auxiliary storage, any other large-scale integration (LSI), and the like. Each of the processors includes a plurality of electronic circuits including a semiconductor integrated circuit and LSI. The plurality of electronic circuits may be mounted on one chip or may be mounted on two or more chips. The functional blocks illustrated in FIG. 9 are implemented by cooperation between hardware and software. Therefore, those skilled in the art will understand that these functional blocks can be implemented in many different ways by hardware only, by software only, or a combination thereof.

An HMD sensor data reception section 202 receives, in a predetermined cycle, the sensor data obtained by the posture sensor 124 of the HMD 100 mounted on the user and supplies the sensor data to the HMD information acquisition section 210. For example, the cycle in which the HMD 100 transmits the sensor data may be set to 11.25 msec. A captured-image reception section 204 receives, in a predetermined cycle, an image captured of the HMD 100 from the imaging apparatus 14 and supplies the image to the HMD information acquisition section 210. For example, the imaging apparatus 14 may image a front space every (1/60) second, and the captured-image reception section 204 may receive the captured image every (1/60) second. An operation data reception section 206 receives, in a predetermined cycle, the sensor data obtained by the posture sensor 54 of the operation apparatus 20 being held by the user. For example, the cycle in which the operation apparatus 20 transmits the sensor data may be set to 11.25 msec. In addition, the operation data reception section 206 receives operation data of the operation button 42 of the operation apparatus 20 being held by the user. The operation data reception section 206 supplies the sensor data obtained by the posture sensor 54 and the operation data of the operation button 42 to the operation information acquisition section 212.

The HMD information acquisition section 210 acquires posture information indicating the posture of the HMD 100 and position information indicating the position of the HMD 100 in the real space, from the sensor data from the HMD 100 and imaged states of the light emitting markers 110 included in the captured image. The HMD information acquisition section 210 may calculate the inclinations of the tracking light emitting markers 110 included in the captured image and may acquire the posture information associated with the HMD 100 by using the calculated inclinations and the sensor data obtained by the triaxial gyro sensor. In addition, the HMD information acquisition section 210 may calculate the movement amount with respect to the reference position by using the sensor data obtained by the triaxial acceleration sensor, to acquire the position information associated with the HMD 100. The HMD information acquisition section 210 supplies the posture information and the position information associated with the HMD 100 to the processing section 220.

The operation information acquisition section 212 acquires, from the sensor data from the operation apparatus 20, posture information indicating the posture of the operation apparatus 20 and position information indicating the position of the operation apparatus 20 in the real space. The operation information acquisition section 212 calculates the posture information associated with the operation apparatus 20 by mainly using the sensor data obtained by the triaxial gyro sensor, and calculates the position information associated with the operation apparatus 20 by using the sensor data obtained by the triaxial acceleration sensor. The posture information and position information associated with the operation apparatus 20 constitute operation information indicating movement of the operation apparatus 20. The operation information acquisition section 212 supplies, as the operation information indicating movement of the operation apparatus 20, the posture information and the position information associated with the operation apparatus 20 to the processing section 220. In addition, the operation information acquisition section 212 supplies the operation data of the operation button 42 to the processing section 220.

The processing section 220 includes a control section 230, a visual-line direction decision section 250, a map holding section 252, a vibration waveform holding section 254, an image generation section 256, and a sound generation section 258. The control section 230 includes a virtual device control section 232, a relation determination section 234, an effect decision section 236, and a driving data generation section 238.

The visual-line direction decision section 250 decides a visual line direction of the user according to the posture information associated with the HMD 100. The visual-line direction decision section 250 transforms the posture information associated with the HMD 100 into the user's visual line direction and supplies the obtained visual line direction to the image generation section 256. The image generation section 256 uses, as information for determining a visual line direction of a player character in the virtual space, the visual line direction provided from the visual-line direction decision section 250. The image generation section 256 may decide the position and direction of a virtual camera on the basis of the position information associated with the HMD 100 that is acquired by the HMD information acquisition section 210 and the visual line direction decided by the visual-line direction decision section 250, to thereby generate an application image.

The virtual device control section 232 controls movement of the virtual device 22 in the virtual space according to the operation information indicating movement of the operation apparatus 20. Specifically, the virtual device control section 232 cyclically acquires the posture information and the position information associated with the operation apparatus 20 from the operation information acquisition section 212, determines the posture and the position of the virtual device 22 in the virtual space according to the posture information and position information associated with the operation apparatus 20, and moves the virtual device 22 in the virtual space in a manner linked to the movement of the operation apparatus 20 in the real space. It is to be noted that the virtual device control section 232 may determine the position or the posture of the virtual device 22 in the virtual space according to the position information or posture information associated with the operation apparatus 20. That is, the virtual device control section 232 may link the position of the virtual device 22 in the virtual space to the position of the operation apparatus 20 in the real space, or may link the posture of the virtual device 22 in the virtual space to the posture of the operation apparatus 20 in the real space.

In the rendering application according to the first embodiment, a player character in the virtual space dips the pen tip of the virtual device 22 into an ink fountain. In this manner, the color of a line to be rendered is decided. Then, the pen tip of the virtual device 22 is moved to a rendering start position. The user moves the operation apparatus 20 while pressing down the operation button 42, whereby a track of the tip end of the operation apparatus 20 is rendered in the virtual space. A rendered line in the virtual 3D space becomes a shield for protecting the player character. The shield can be used to protect the player character against a virtual object (shell) flying toward the player character. During this series of progress, the operation apparatus 20 provides kinesthetic feedback and/or tactile feedback to the user. Consequently, the user can physically feel an effect in response to an action in the virtual space. Hereinafter, effects in some scenes of the application will be explained.

<Scene Where a Pen Tip is Dipped Into an Ink Fountain>

Figure 10:
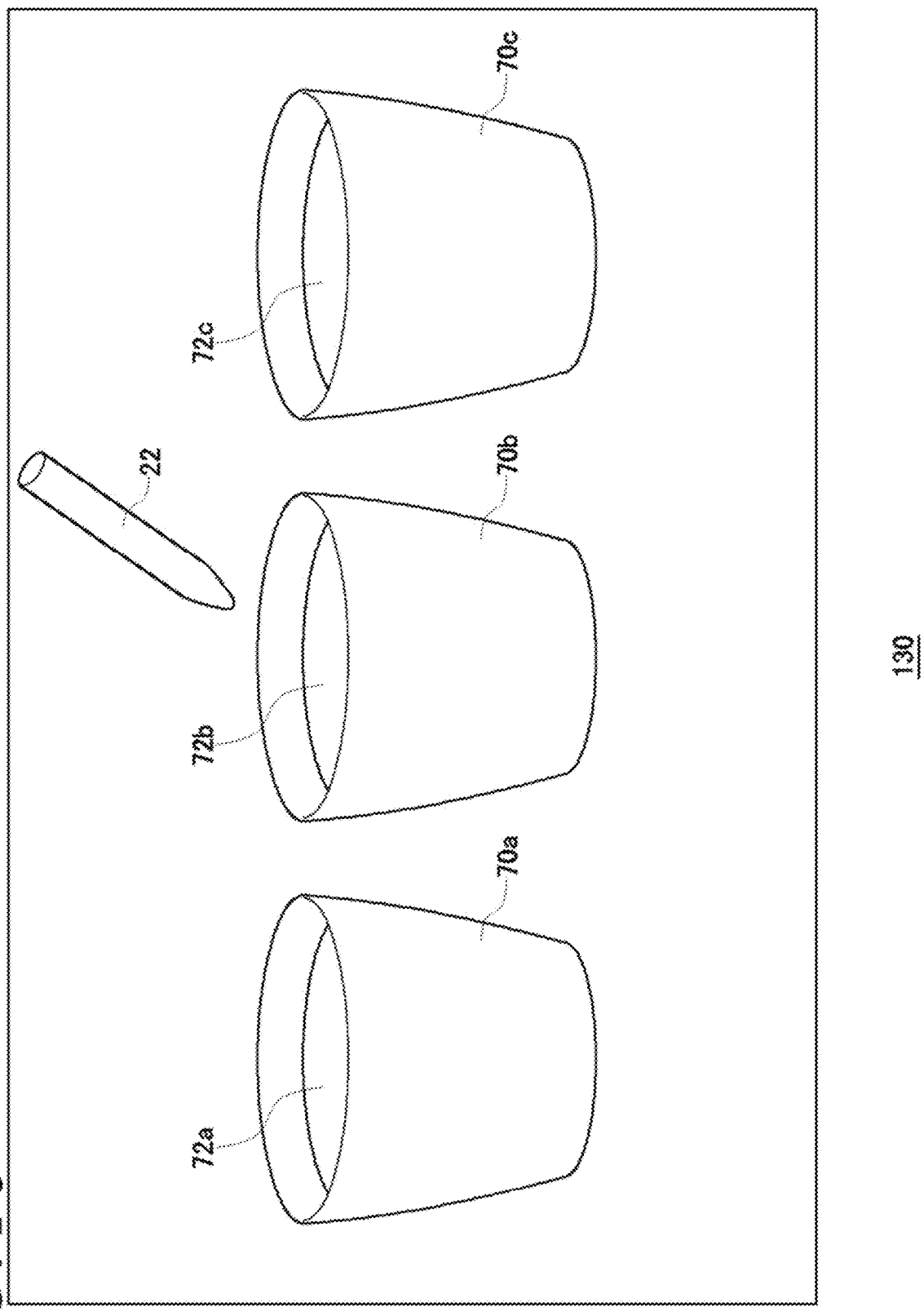
FIG. 10 is a diagram illustrating an example of a screen displayed on a display panel.

FIG. 10 indicates an example of a screen displayed on the display panel 130 of the HMD 100. A plurality of ink fountains 70a, 70b, and 70c that are filled with respective inks are displayed on the display panel 130. The plurality of ink fountains 70a, 70b, and 70c are disposed in respective predetermined positions in the virtual space and are filled with inks of different colors. The ink fountain 70a is filled with a red ink 72a, the ink fountain 70b is filled with a blue ink 72b, and the ink fountain 70c is filled with a yellow ink 72c. The user moves the virtual device 22 to a point above the ink fountain 70 of a color that the user wants to use, and dips the pen tip into the ink. It is to be noted that illustration of the player character holding the virtual device 22 is omitted in the display screens in FIGS. 10, 15, and 16.

Figure 11:
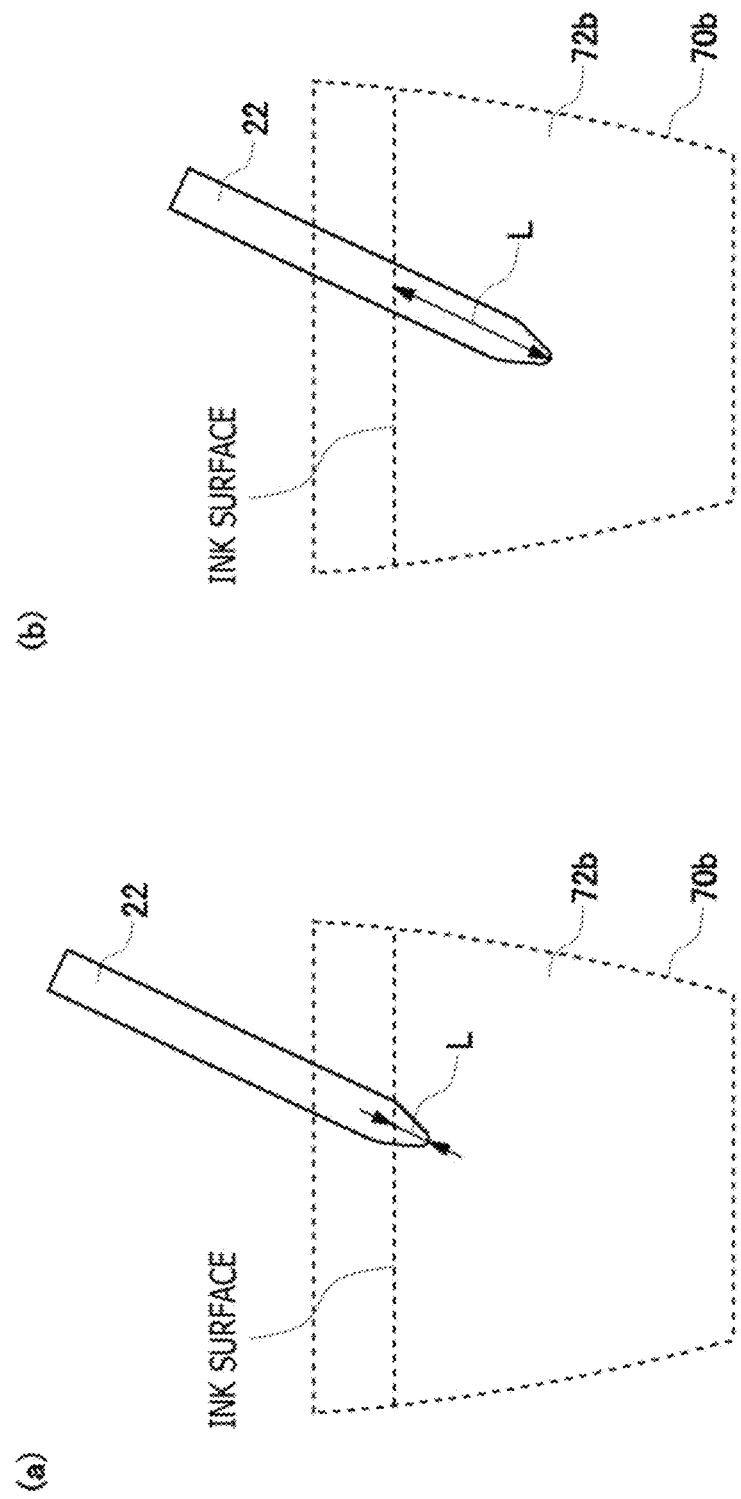
FIG. 11 is a diagram illustrating a manner of causing a virtual device to enter an ink.

FIG. 11 illustrates a manner of causing the virtual device 22 to enter the blue ink 72b in the ink fountain 70b. FIG. 11(a) indicates a situation in which the pen tip is slightly under the ink surface, and FIG. 11(b) indicates a situation in which substantially a half of the virtual device 22 is in the blue ink 72b. The virtual device control section 232 controls movement of the virtual device 22 according to the posture information and the position information associated with the operation apparatus 20.

The relation determination section 234 determines a relative relation between the virtual device 22 and the blue ink 72b which is a virtual object. The effect decision section 236 decides an effect to be exhibited to the operation apparatus 20, on the basis of the relative relation determined by the relation determination section 234. In the first embodiment, when the virtual device 22 is brought into contact with the virtual object, the effect decision section 236 may decide an effect of the contact.

The relation determination section 234 determines the positional relation between the virtual device 22 and the blue ink 72b on the basis of the 3D coordinates of the ink fountain 70b disposed at a predetermined position and the 3D coordinates of the virtual device 22. In the first embodiment, the relation determination section 234 derives a length (entry length L) by which the virtual device 22 has entered the blue ink 72b, on the basis of the determined positional relation. When the virtual device 22 gets into the blue ink 72b, the effect decision section 236 decides to move the movable section 32 which is the kinesthetic sense presentation section in such a direction as to be drawn into the base body 30. In this regard, the effect decision section 236 derives the movement amount of the movable section 32 which is the kinesthetic sense presentation section on the basis of the entry length L.

FIG. 12(a) illustrates an example of a map defining a relation between the entry length L and the movement amount of the movable section 32. This relation is held as a map in the map holding section 252. The movement amount represents a drawn amount of the movable section 32 from the reference position. In the relation indicated in FIG. 12(a), the entry length is proportional to the movement amount. Thus, the movable section 32 is drawn into the base body 30 by an amount that is proportional to the entry length of the virtual device 22 in the blue ink 72b. The effect decision section 236 receives the entry length L from the relation determination section 234, acquires a moving amount corresponding to the entry length L in reference to the map held in the map holding section 252, and supplies the movement amount to the driving data generation section 238. The driving data generation section 238 generates first driving data for driving the movable section 32, on the basis of the movement amount.

The map holding section 252 may hold, for each virtual object, a map defining the relation between the entry length L and the movement amount of the movable section 32. For example, the map holding section 252 may hold different maps for the red ink 72a, the blue ink 72b, and the yellow ink 72c.

FIG. 12(b) illustrates another example of the map defining the relation between the entry length L and the movement amount of the movable section 32. This relation is held in the map holding section 252. The relation indicated in FIG. 12(b) has a moving profile in which the movable section 32 largely moves when the virtual device 22 starts getting into an ink, and then, the movable section 32 gradually moves after the virtual device 22 has reached a certain point. Since the map holding section 252 holds, for each virtual object (inks in the first embodiment), a map defining the relation between the entry length and the movement amount, the user can feel a resistance unique to the virtual object with which the virtual device 22 is in contact, through a kinesthetic sense presented by the movable section 32.

Further, in the first embodiment, the relation determination section 234 determines a relative speed between the virtual device 22 and the blue ink 72b which is the virtual object, and the effect decision section 236 decides an effect to be exhibited to the operation apparatus 20, on the basis of the relative speed determined by the relation determination section 234.

The relation determination section 234 determines a speed (moving speed) at which the virtual device 22 enters the blue ink 72b. The moving speed of the virtual device 22 is equivalent to the relative speed between the virtual device 22 and the blue ink 72b because the blue ink 72b which is the virtual object is stationary. The effect decision section 236 derives a vibration profile of the vibration section 40 which is the tactile sense presentation section on the basis of the moving speed of the virtual device 22. The vibration profile here may be defined by a vibration waveform and a vibration amount.

Figure 13:
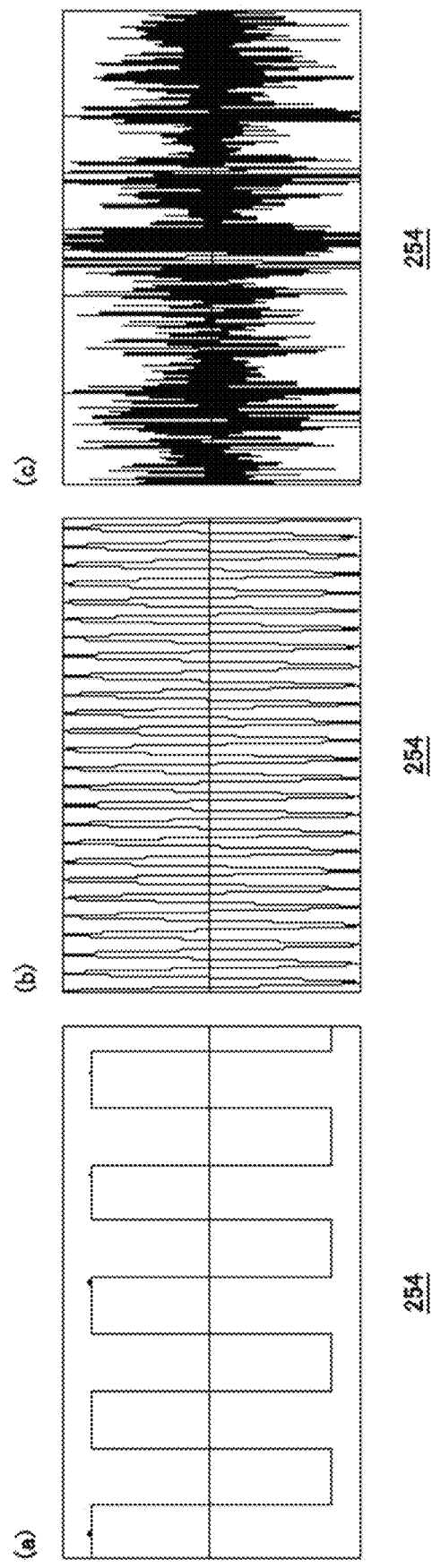
FIG. 13 is a diagram of examples of vibration waveforms.

FIGS. 13(a) to 13(c) each illustrate an example of a vibration waveform. The horizontal axes each indicate time. The vibration waveform holding section 254 holds, for each virtual object, a vibration waveform which is a pattern of vibrating the vibration section 40. The vibration waveforms indicated in FIGS. 13(a) and 13(b) are cyclic while the vibration waveform indicated in FIG. 13(c) is not cyclic. In this manner, the vibration waveform can be freely set for each virtual object. Each vibration waveform has a normalized vibration pattern. A vibration amount (amplitude) which is determined according to the moving speed is multiplied with the vibration waveform, so that the vibration profile of the vibration section 40 is derived.

FIG. 14(a) illustrates an example of a map defining a relation between the moving speed and the vibration amount of the vibration section 40. This relation is held as a map in the map holding section 252. The vibration amount represents the amplitude of a vibration waveform. In the relation indicated in FIG. 14(a), the moving speed is proportional to the vibration amount (amplitude). Therefore, the vibration amplitude of the vibration section 40 increases in proportion to the moving speed of the virtual device 22. The effect decision section 236 receives a moving speed from the relation determination section 234, acquires a vibration amount corresponding to the moving speed in reference to the map held in the map holding section 252, and multiplies the vibration amount with a vibration waveform corresponding to the virtual object which waveform is held in the vibration waveform holding section 254, so that the vibration profile is derived. The effect decision section 236 supplies the derived vibration profile to the driving data generation section 238. The driving data generation section 238 generates second driving data for driving the vibration section 40, on the basis of the vibration profile.

The map holding section 252 may hold, for each virtual object, a map defining the relation between the moving speed and the vibration amount of the vibration section 40. For example, the map holding section 252 may hold different maps for the red ink 72a, the blue ink 72b, and the yellow ink 72c.

FIG. 14(b) illustrates another example of the map defining the relation between the moving speed and the vibration amount of the vibration section 40. The map holding section 252 holds, for each virtual object (inks in the first embodiment), a map defining the relation between the moving speed and the vibration amount. Accordingly, through a tactile sense presented by the vibration section 40, the user can feel a charactristic unique to the virtual object with which the virtual device 22 is in contact.

The transmission section 260 transmits the first driving data and the second driving data generated by the driving data generation section 238 to the operation apparatus 20. In the operation apparatus 20, the control section 50 drives the movable section 32 in reference to the first driving data and drives the vibration section 40 in reference to the second driving data. Specifically, the control section 50 controls the first rotary actuator 310 while monitoring a detection value obtained by the first rotational angle sensor 322, and moves the movable section 32 located at the reference position in such a direction as to be drawn into the base body 30. Therefore, the movable section 32 is drawn into the base body 30 by a movement amount corresponding to the entry length of the virtual device 22. At the same time, the vibration section 40 vibrates according to the vibration profile corresponding to the moving speed of the virtual device 22. With the information processing system 1 according to the embodiment, kinesthetic feedback and tactile feedback are simultaneously presented in response to an operation made on the operation apparatus 20. Accordingly, the entertainability of the application can be enhanced.

<Scene in Which a Line is Drawn With an Ink in a Space>

Figure 15:
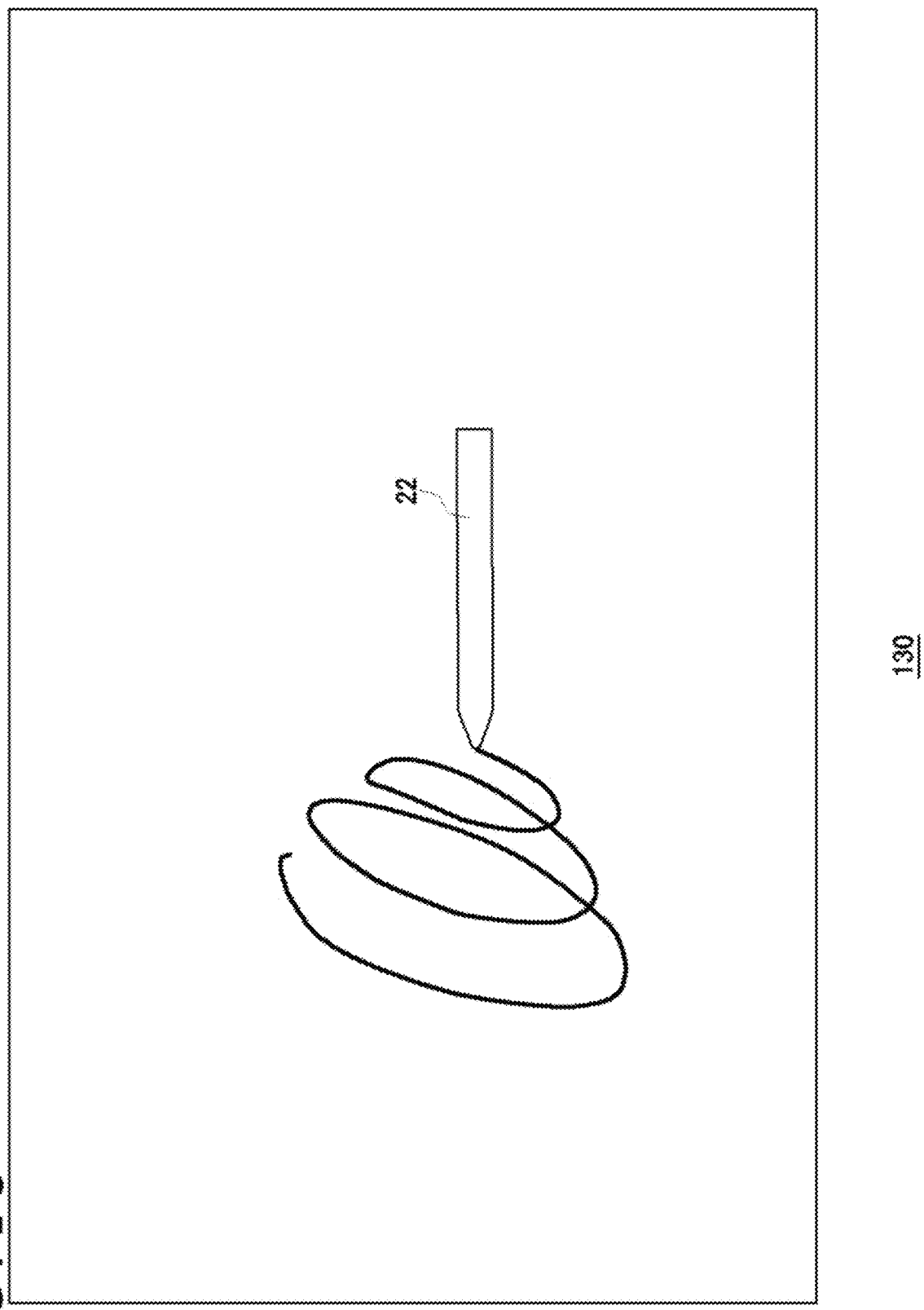
FIG. 15 is a diagram illustrating an example of a screen displayed on the display panel.

FIG. 15 illustrates an example of a screen displayed on the display panel 130 of the HMD 100. After the pen tip of the virtual device 22 is dipped into the blue ink 72b, the pen tip of the virtual device 22 is moved to a rendering start position, and then, the user moves the operation apparatus 20 in the real space while pressing down the operation button 42. As a result, a track of the pen tip of the virtual device 22 corresponding to the tip end of the operation apparatus 20 is rendered in the virtual space. In this scene, the relation determination section 234 determines the moving speed of the virtual device 22, and the effect decision section 236 decides an effect to be exhibited to the operation apparatus 20, on the basis of the moving speed determined by the relation determination section 234.

The relation determination section 234 determines the moving speed of the virtual device 22 on the basis of the moving speed of the operation apparatus 20 in which the operation button 42 is being depressed. The effect decision section 236 derives a vibration profile of the vibration section 40 which is the tactile sense presentation section, on the basis of the moving speed of the virtual device 22. As previously explained, the vibration profile may be defined by a vibration waveform and a vibration amount. The driving data generation section 238 generates second driving data for driving the vibration section 40, on the basis of the vibration profile.

The vibration waveform holding section 254 may hold, for each ink color, a vibration waveform which is a pattern of vibrating the vibration section 40. In addition, the map holding section 252 may hold, for each ink color, a map defining the relation between the moving speed and the vibration amount of the vibration section 40. Since a vibration waveform and a vibration amount corresponding to each ink color are prepared, tactile feedback corresponding to the color of a line being drawn can be presented to the user, and the user can enjoy the difference in tactile feedback according to the color of the line.

<Scene in Which a Drawn Line is Used as a Shield>

Figure 16:
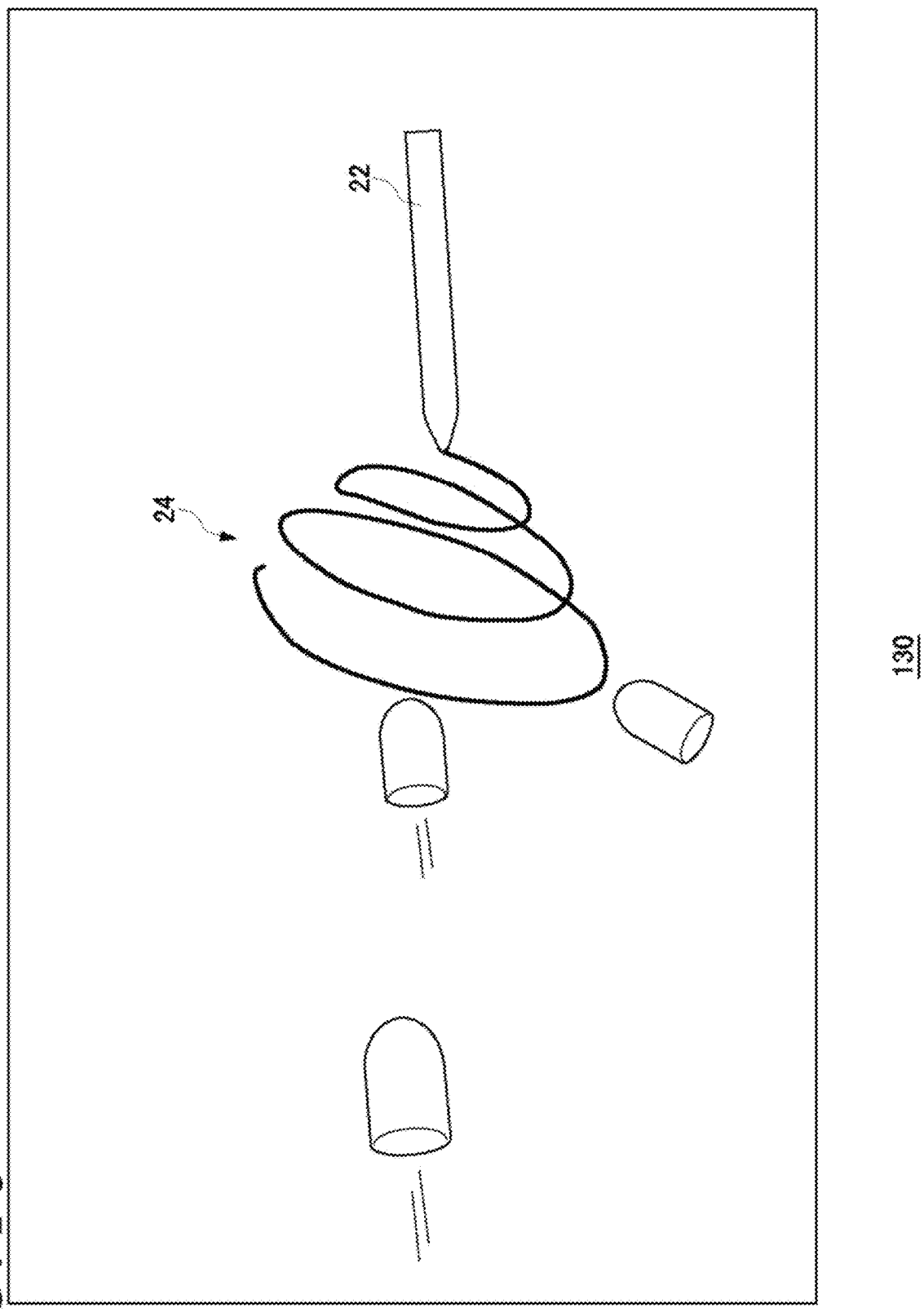
FIG. 16 is a diagram illustrating an example of a screen displayed on the display panel.

FIG. 16 illustrates an example of a screen displayed on the display panel 130 of the HMD 100. In the rendering application, a line drawn by the user is used as a protective shield against a flying virtual object while the shape of the line is maintained. In this scene, a shield 24 is mounted on the tip of the virtual device 22, and the user orients the shield 24 toward a direction from which the virtual object (shell in this example) is flying, so as to protect the player character against the virtual object.

The relation determination section 234 determines a relative relation between the virtual device 22 and the shield 24 on one hand and the shell which is a virtual object on the other hand. The effect decision section 236 decides an effect to be exhibited to the operation apparatus 20, on the basis of the relative relation determined by the relation determination section 234. In the first embodiment, when the shield 24 and the virtual object come into contact with each other, the effect decision section 236 may decide an effect of the contact.

The relation determination section 234 decides a collision between the virtual object, which is a shell, and the shield 24 on the basis of the 3D coordinates of the virtual object and the 3D coordinates of the shield 24. When a collision between the virtual object and the shield 24 is decided, the effect decision section 236 decides to drive the movable section 32 which is the kinesthetic sense presentation section.

Figure 17:
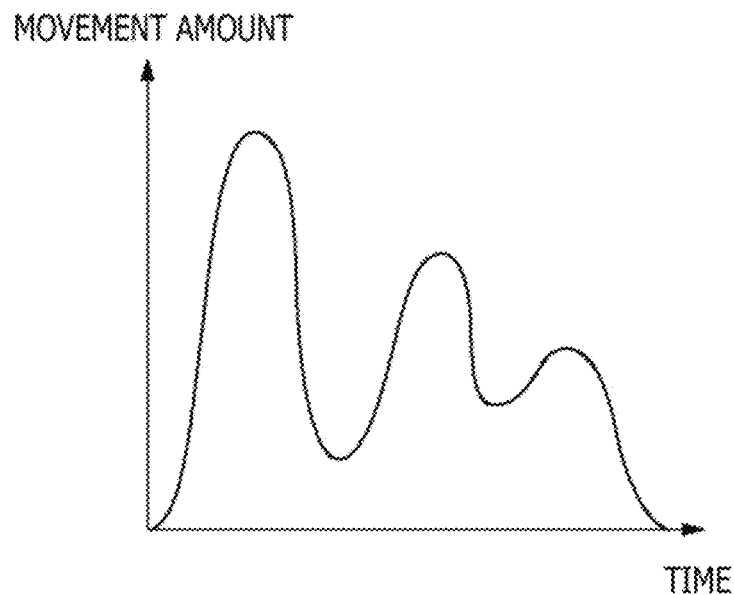
FIG. 17 is a diagram illustrating an example of a map in which a relation between an elapsed time from a collision and the movement amount of the movable section is determined.

FIG. 17 illustrates an example of a map defining a relation between an elapsed time from a collision and the movement amount of the movable section 32. This relation is held as a map in the map holding section 252. The movement amount represents a drawn amount of the movable section 32 from the reference position. The map holding section 252 may hold, for each virtual object, a map defining the relation between the elapsed time from a collision and the movement amount of the movable section 32. For example, the maps may be set according to the types or sizes of the virtual objects. After receiving a notification regarding a collision from the relation determination section 234, the effect decision section 236 reads out the map held in the map holding section 252 and supplies the map to the driving data generation section 238. The driving data generation section 238 generates first driving data for driving the movable section 32, on the basis of a movement profile defined in the map.

Further, in the first embodiment, the relation determination section 234 determines the relative speed between the virtual device 22 and the shell, which is the virtual object, and the effect decision section 236 decides an effect to be exhibited to the operation apparatus 20, on the basis of the relative speed determined by the relation determination section 234. Specifically, the effect decision section 236 derives a vibration profile of the vibration section 40 which is the tactile sense presentation section on the basis of the relative speed between the virtual device 22 and the virtual object. The vibration profile here may be defined by a vibration waveform and a vibration amount.

Figure 18:
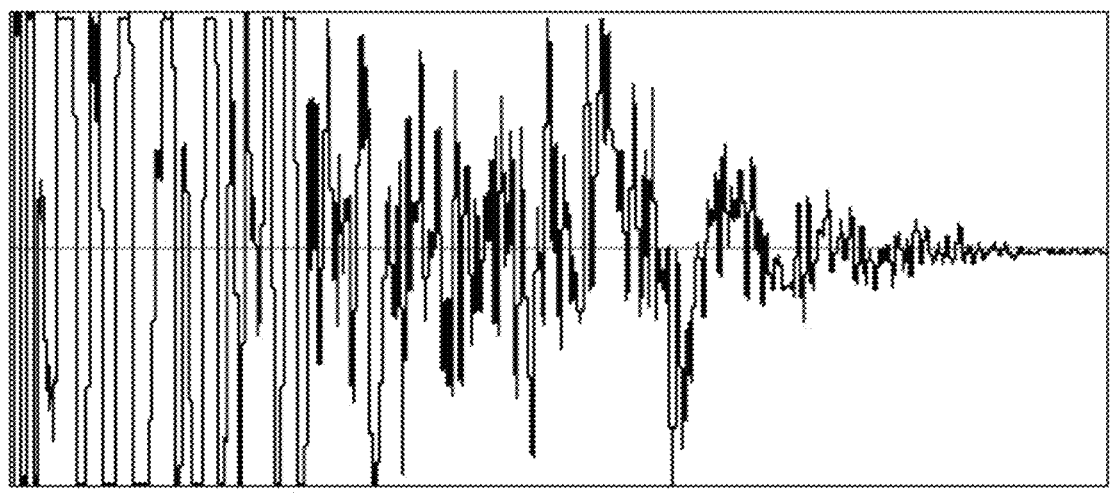
FIG. 18 is a diagram illustrating an example of a vibration waveform.

FIG. 18 illustrates an example of a vibration waveform. The horizontal axis indicates the elapsed time from a collision. The vibration waveform holding section 254 holds, for each virtual object with which a collision may occur, a vibration waveform which is a pattern of vibrating the vibration section 40. The effect decision section 236 receives a moving speed from the relation determination section 234, acquires a vibration amount corresponding to the moving speed in reference to the map held in the map holding section 252, and multiplies the vibration amount with a vibration waveform corresponding to the virtual object which waveform is held in the vibration waveform holding section 254, so that the vibration profile is derived. The effect decision section 236 supplies the derived vibration profile to the driving data generation section 238. The driving data generation section 238 generates second driving data for driving the vibration section 40, on the basis of the vibration profile.

The transmission section 260 transmits the first driving data and the second driving data generated by the driving data generation section 238 to the operation apparatus 20. In the operation apparatus 20, the control section 50 drives the movable section 32 in reference to the first driving data and drives the vibration section 40 in reference to the second driving data. With the information processing system 1 according to the embodiment, kinesthetic feedback and tactile feedback are simultaneously presented in response to an operation made on the operation apparatus 20. Accordingly, the entertainability of the application can be enhanced.

Second Embodiment

In the operation apparatus 20 according to the first embodiment, the movement mechanism 300 moves the movable section 32 in the longitudinal direction of the base body 30 such that a kinesthetic sense of pressing the finger of the hand in the longitudinal direction of the base body 30 is presented to the user. In an operation apparatus 400 according to a second embodiment, a movable section 403 is rotated about an axis that extends parallel with a longitudinal direction of a base body 402, such that a kinesthetic sense of moving the finger of the hand about the longitudinal direction of the base body 402 is presented to the user.

Figure 19:
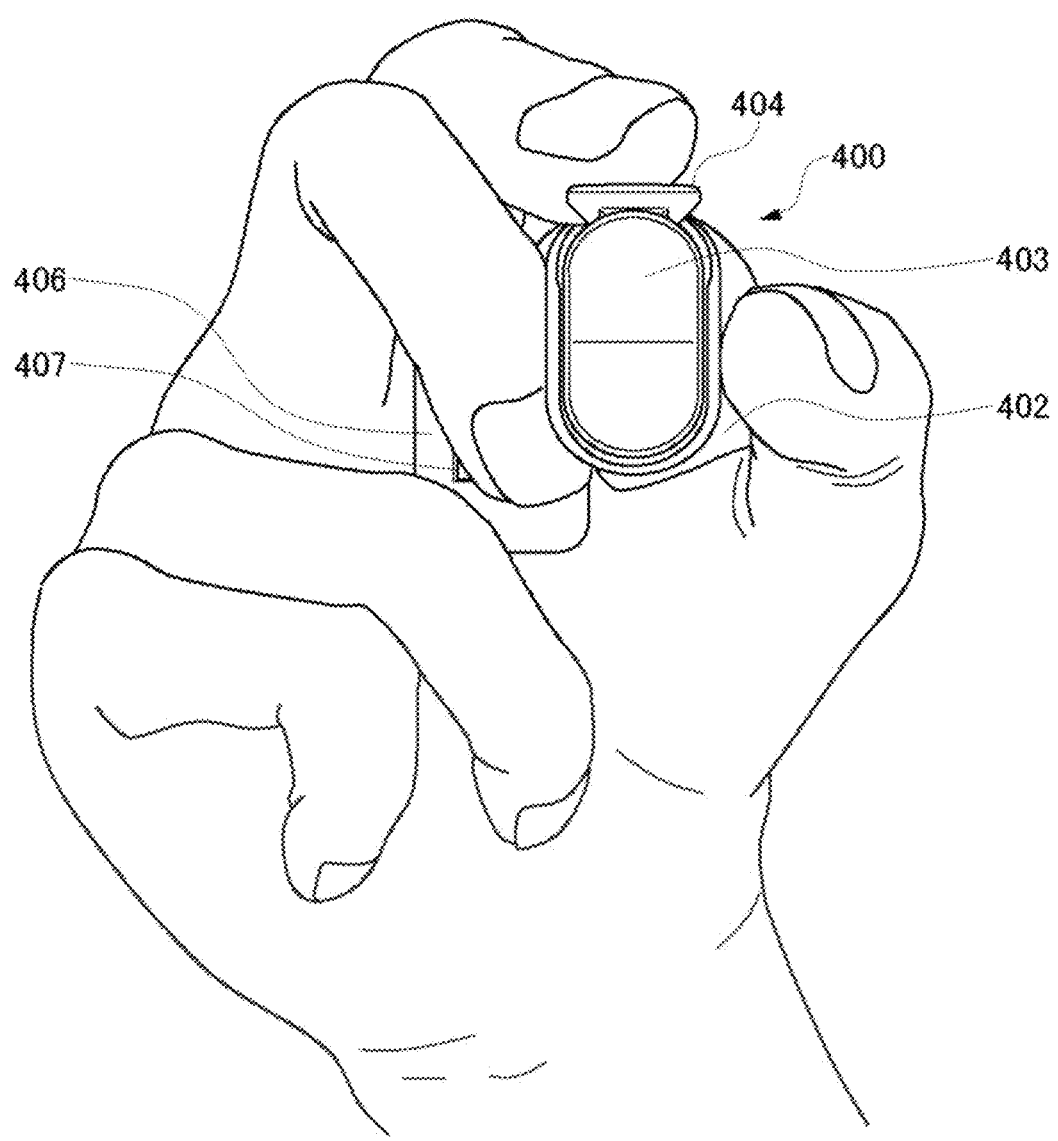
FIG. 19 is a diagram illustrating a situation in which a user is holding an operation apparatus.

FIG. 19 illustrates a situation where the user is holding the operation apparatus 400 according to the second embodiment. The operation apparatus 400 includes the base body 402 that is held by the user's hand and the movable section 403 that is a component movable relative to the base body 402. The operation apparatus 400 is a pen-like haptics device. The base body 402 has opposite side surfaces that are substantially parallel to each other. The user uses the operation apparatus 400 with the thumb and the middle finger put on the side surfaces of the base body 402 in such a manner as to sandwich the base body 402 and the index finger put on the movable section 403.

The movable section 403 functions as a kinesthetic sense presentation section that presents a kinesthetic sense to the user's hand. The movable section 403 is driven in reference to the driving data transmitted from the information processing apparatus 10 and provides kinesthetic feedback to the user. The movable section 403 according to the second embodiment is movable in the longitudinal direction of the base body 402 relative to the base body 402, and further, is rotatable about the axis which is parallel with the longitudinal direction of the base body 402, relative to the base body 402.

A switch-equipped member 406 on which an operation button 407 that can be operated with a tip of the middle finger is disposed is provided on a side surface of the base body 402. The operation button 407 is a push-type button. The user presses down the operation button 407 to turn on a switch (not illustrated) having a contact point structure. The user can turn on the switch by pressing down the operation button 407 with the middle finger.

Like the operation apparatus 20 according to the first embodiment, the operation apparatus 400 according to the second embodiment is used as the virtual device 22 that gives off an ink in the rendering application for drawing a picture and a character in a virtual 3D space. On the display panel 130 and the output apparatus 15, the virtual device 22 is displayed as a virtual pen having a pen tip. In the rendering application, the tip of the operation apparatus 400 corresponds to the pen tip of the virtual device 22. When the user moves the operation apparatus 400 in the real space, the virtual device 22 exhibits, in the virtual space, a behavior linked to the operation apparatus 400.

In the rendering application, when the movable section 403 slidingly moves with respect to the base body 402, a kinesthetic sense acting in a depression direction of the pen tip is presented to the index finger, and, when the movable section 403 rotationally moves with respect to the base body 402, a kinesthetic sense (which corresponds to a frictional force acting on the pen tip) acting in a direction opposite to the moving direction of the pen tip in the virtual space is presented to the index finger. Since such kinesthetic senses are presented, the user can physically feel that the user is drawing a picture or a character by moving the virtual pen.

Figure 20:
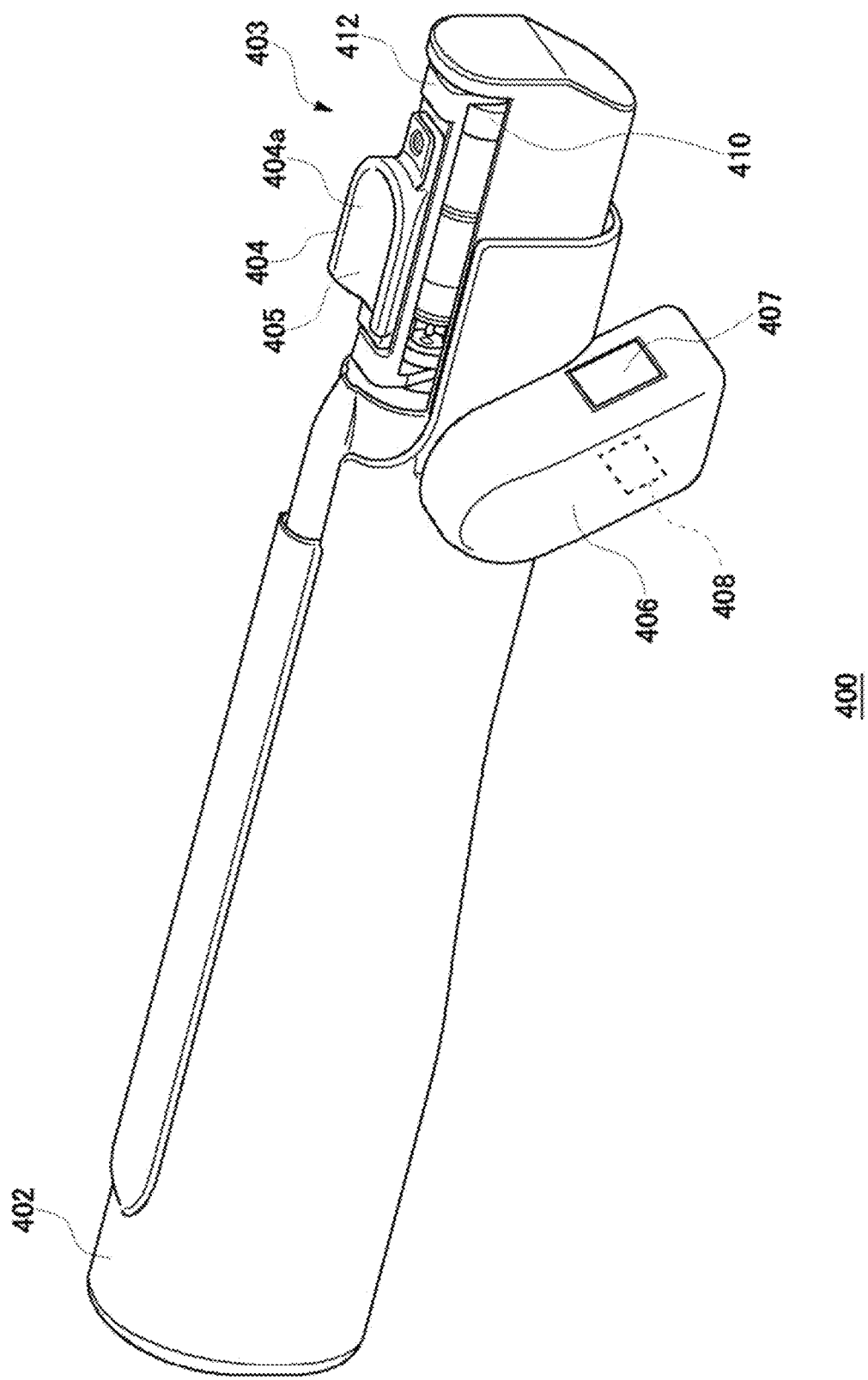
FIG. 20 is a perspective view of the operation apparatus.

FIG. 20 is a perspective view of the operation apparatus 400. In the operation apparatus 400, a side on which the movable section 403 is disposed is defined as a tip side. A vibration section 408 including a vibrator is provided inside the switch-equipped member 406. The vibration section 408 functions as a tactile sense presentation section that vibrates to present a tactile sense to the user's hand (middle finger). The vibration section 408 is driven in reference to the driving data transmitted from the information processing apparatus 10, and presents tactile feedback to the user.

In the state illustrated in FIG. 20, the movable section 403 is at a position projecting forward maximally from the base body 402. This position is a "reference position" of the movable section 403. In the state illustrated in FIG. 20, the rotational angle of the movable section 403 is zero. This posture is a "reference posture" of the movable section 403.

A finger placement section 405 on which the fingertip of the index finger is placed while the user is holding the base body 402 is provided on an upper surface of the movable section 403. A finger engagement section 404 with which the tip portion of the finger is to engage is provided on side portions and a front end portion of the finger placement section 405. The finger engagement section 404 stands on an upper surface of a beam member of a support frame 412, which will be explained later. The finger engagement section 404 has a curved surface 404a that is inclined in such a manner as to be along the pad of the finger and that has a curvature radius. The curved surface 404a is inclined with respect to the upper surface of the beam member and is formed to be recessed in a direction in which contact with the fingertip is made, so that the user is allowed to stably put the tip portion of the index finger in contact with the curved surface 404a.

The user puts the thumb and the middle finger on the side surfaces of the base body 402 in such a manner as to sandwich the base body 402 and puts the pad of the index finger on the finger placement section 405, just like holding a pen, while putting the pad of the middle finger on a surface of the switch-equipped member 406. It is to be noted that the user may hold the base body 402 with three or more fingers and may put the pad of another finger that does not substantially hold the base body 402, on the finger placement section 405. Since the base body 402 of the operation apparatus 400 is held with two or more fingers in this manner, the base body 402 can be fixed in the hand without requiring any special grip mechanism for fixing the base body 402 in the hand.

Figure 21:
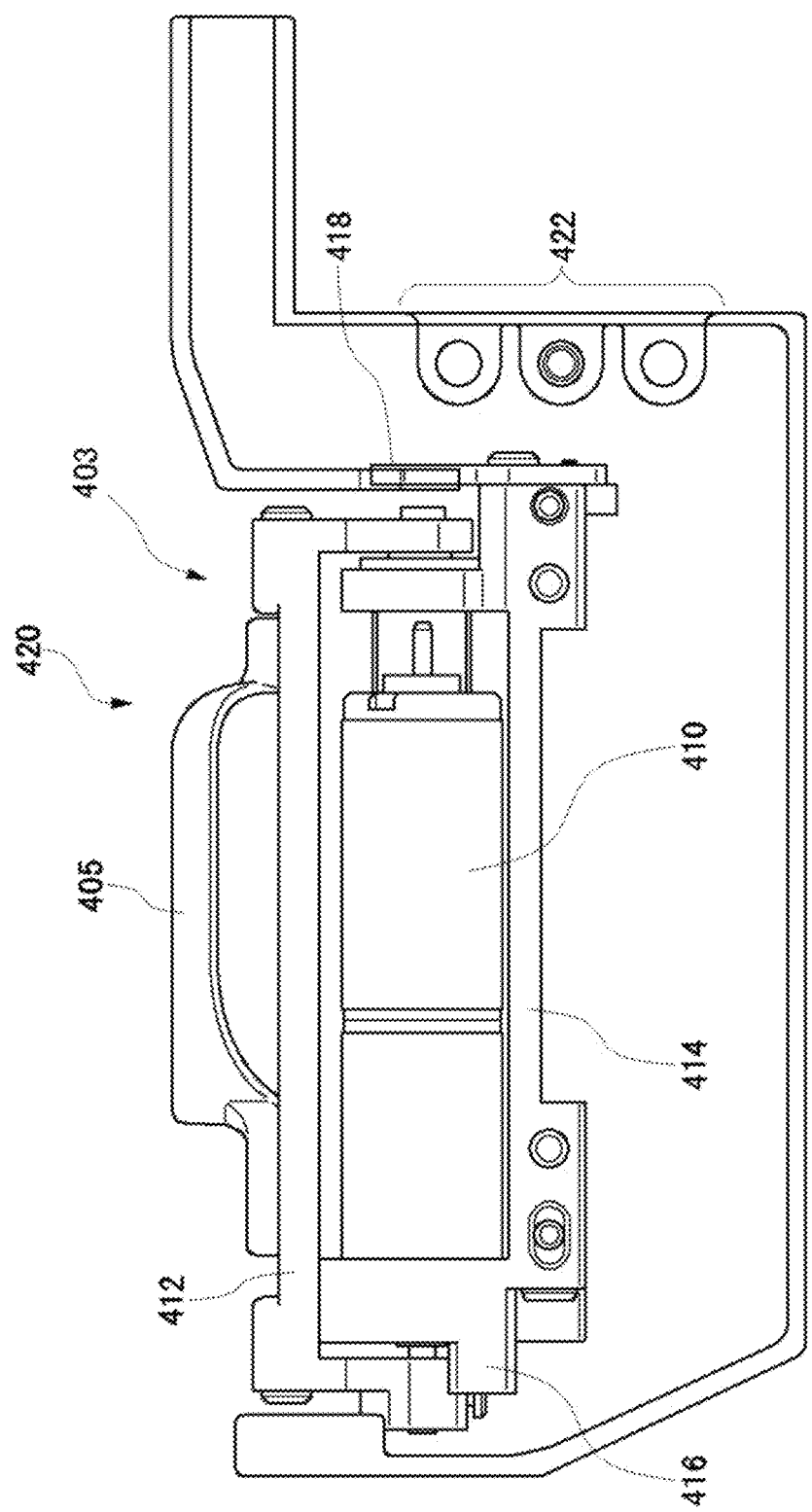
FIG. 21 is a diagram illustrating a movement mechanism that moves a movable section relative to a base body.

FIG. 21 illustrates a movement mechanism 420 that rotationally moves the movable section 403 relative to the base body 402. The movement mechanism 420 includes a second rotary actuator 410, the support frame 412, a base section 414, a stopper 416, and a second rotational angle sensor 418. The movement mechanism 420 rotationally moves the movable section 403 about its axis. It is to be noted that the fixation section 320 illustrated in FIG. 7 is fixed to a fixed section 422 of the movable section 403, so that the movable section 403 is slidable with the movement mechanism 300.

The base section 414 is fixed to a casing of the movable section 403 and supports the support frame 412 on which the finger placement section 405 is disposed, in a rotatable manner. The support frame 412 has a gate-like structure including a pair of pillar members and a beam member connecting the pillar members. The pair of pillar members are connected to the base section 414 in a rotatable manner, and the finger placement section 405 is mounted on the upper surface of the beam member. The second rotary actuator 410 is fixed to the base section 414, and a motor shaft is coupled to one of the pillars of the support frame 412. In the movement mechanism 420, when the second rotary actuator 410 rotates in a normal or reverse direction, the support frame 412 is rotated to the left or right side, when the operation apparatus 400 is viewed from the front side. A pair of the stoppers 416 are formed on the base section 414. The stoppers 416 regulate rotation of the support frame 412. The second rotational angle sensor 418 detects a rotational angle of the second rotary actuator 410. Rotation of the movable section 403 is controlled on the basis of a detection value obtained by the second rotational angle sensor 418.

Figure 22:
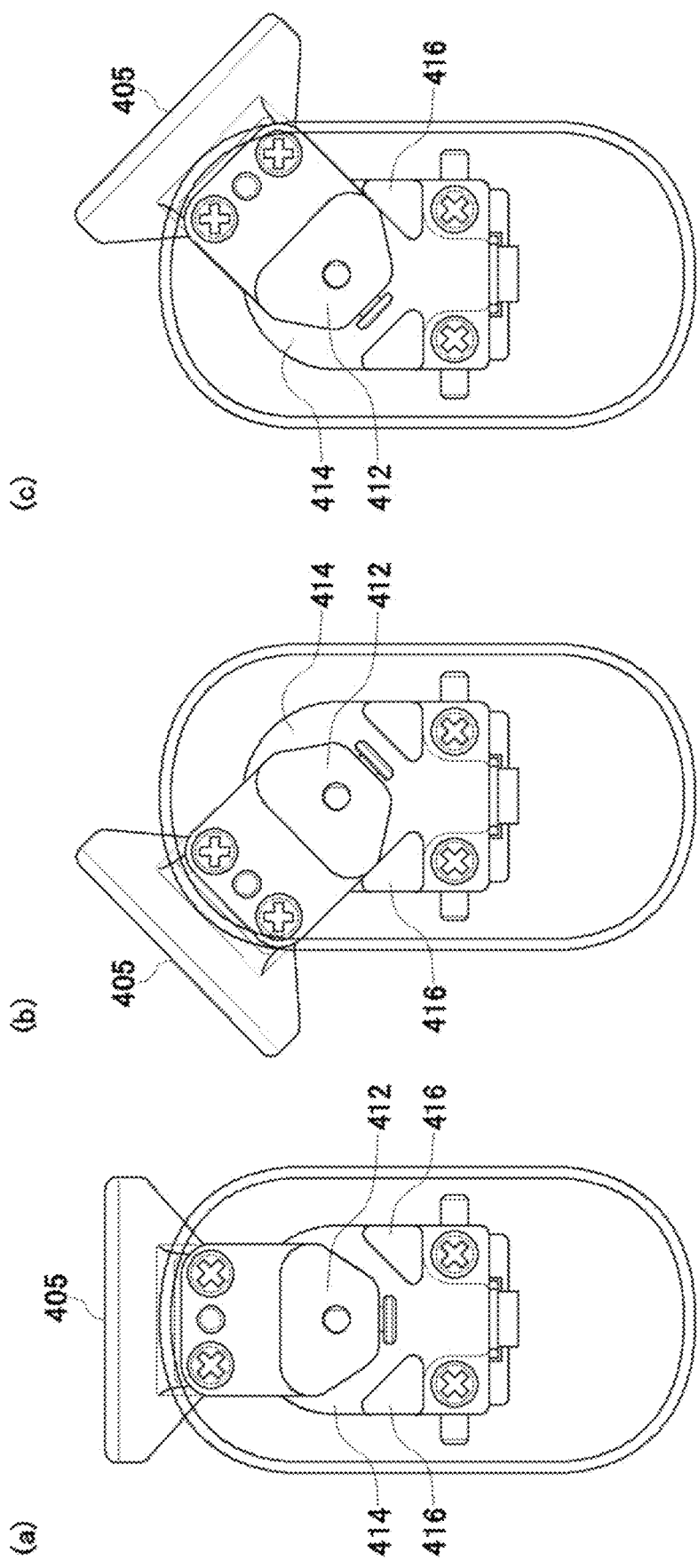
FIG. 22 is a diagram illustrating inclinations of a support frame when the operation apparatus is viewed from a front side.

FIG. 22 illustrates inclinations of the support frame 412 in a front view of the operation apparatus 400.

FIG. 22(a) illustrates the base section 414 and the support frame 412 in the reference posture. In the reference posture, the rotational angle is 0 degrees.

FIG. 22(b) illustrates a state where the support frame 412 has been rotated to the left side with respect to the base section 414. Rotation of the support frame 412 is regulated by the stoppers 416. The maximum rotational angle of a leftward rotation of the support frame 412 may be −45 degrees.

FIG. 22(c) illustrates a state where the support frame 412 has been rotated to the right side with respect to the base section 414. Rotation of the support frame 412 is regulated by the stoppers 416. The maximum rotation angle of a rightward rotation of the support frame 412 may be +45 degrees.

Figure 23:
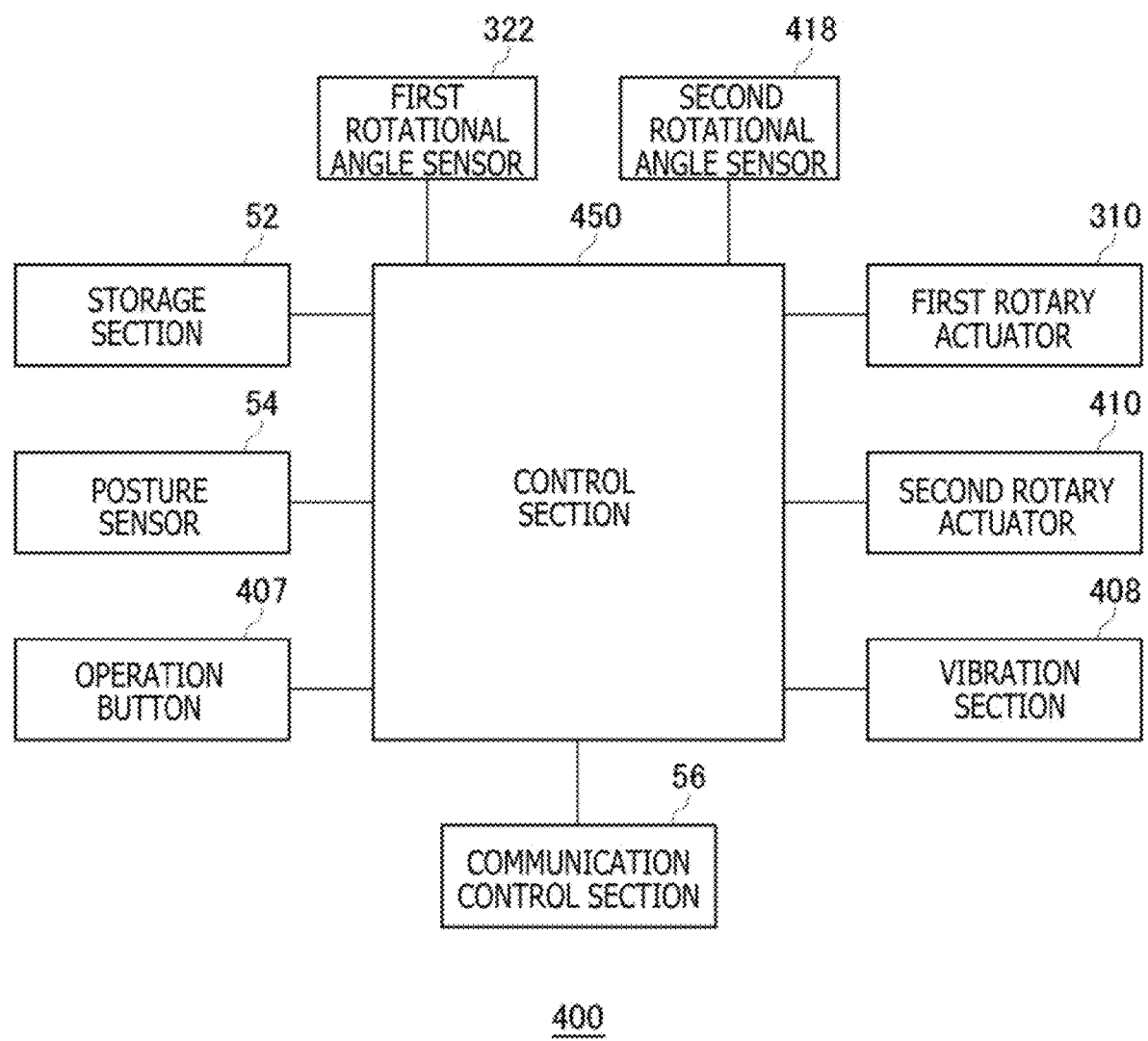
FIG. 23 is a diagram illustrating functional blocks of the operation apparatus.

FIG. 23 illustrates functional blocks of the operation apparatus 400. A control section 450 is a main processor that processes commands and various types of data such as sensor data and driving data and outputs the processed data and commands. A storage section 52 temporarily stores data and commands which are processed by the control section 450. A posture sensor 54 detects posture information associated with the operation apparatus 400. The posture sensor 54 includes at least a triaxial acceleration sensor and a triaxial gyro sensor.

A communication control section 56 transmits data outputted from the control section 450, to the information processing apparatus 10 which is external to the operation apparatus 400, through wired or wireless communication via a network adapter or an antenna. In addition, the communication control section 56 receives data from the information processing apparatus 10 through wired or wireless communication via a network adapter or an antenna and outputs the data to the control section 450.

When receiving driving data from the information processing apparatus 10, the control section 450 drives the first rotary actuator 310, the second rotary actuator 410, and/or the vibration section 408. Here, the first rotary actuator 310 is a driving section that moves the movable section 403 in the longitudinal direction of the base body 402, and the second rotary actuator 410 is a driving section that rotates the movable section 403 about the axis that is parallel with the longitudinal direction of the base body 402. In the operation apparatus 400, the movable section 403 is a component (kinesthetic sense presentation section) that presents a kinesthetic sense to the user's hand, and the vibration section 408 is a vibrator (tactile sense presentation section) that presents a tactile sense to the user's hand. The movable section 403 and the vibration section 408 provide kinesthetic feedback and tactile feedback, respectively, so that the user can realistically feel an event occurring in the application. The control section 450 causes the communication control section 56 to transmit the sensor data obtained by the posture sensor 54 to the information processing apparatus 10.

The operation apparatus 400 according to the second embodiment is used as the virtual device 22 that gives off an ink in the rendering application for drawing a picture and a character in a virtual 3D space. On the display panel 130 and the output apparatus 15, the virtual device 22 is displayed as a virtual pen having a pen tip. In the rendering application, the tip of the operation apparatus 400 corresponds to the pen tip of the virtual device 22. When the user moves the operation apparatus 400 in the real space, the virtual device 22 exhibits, in the virtual space, a behavior linked to the operation apparatus 400.

Figure 24:
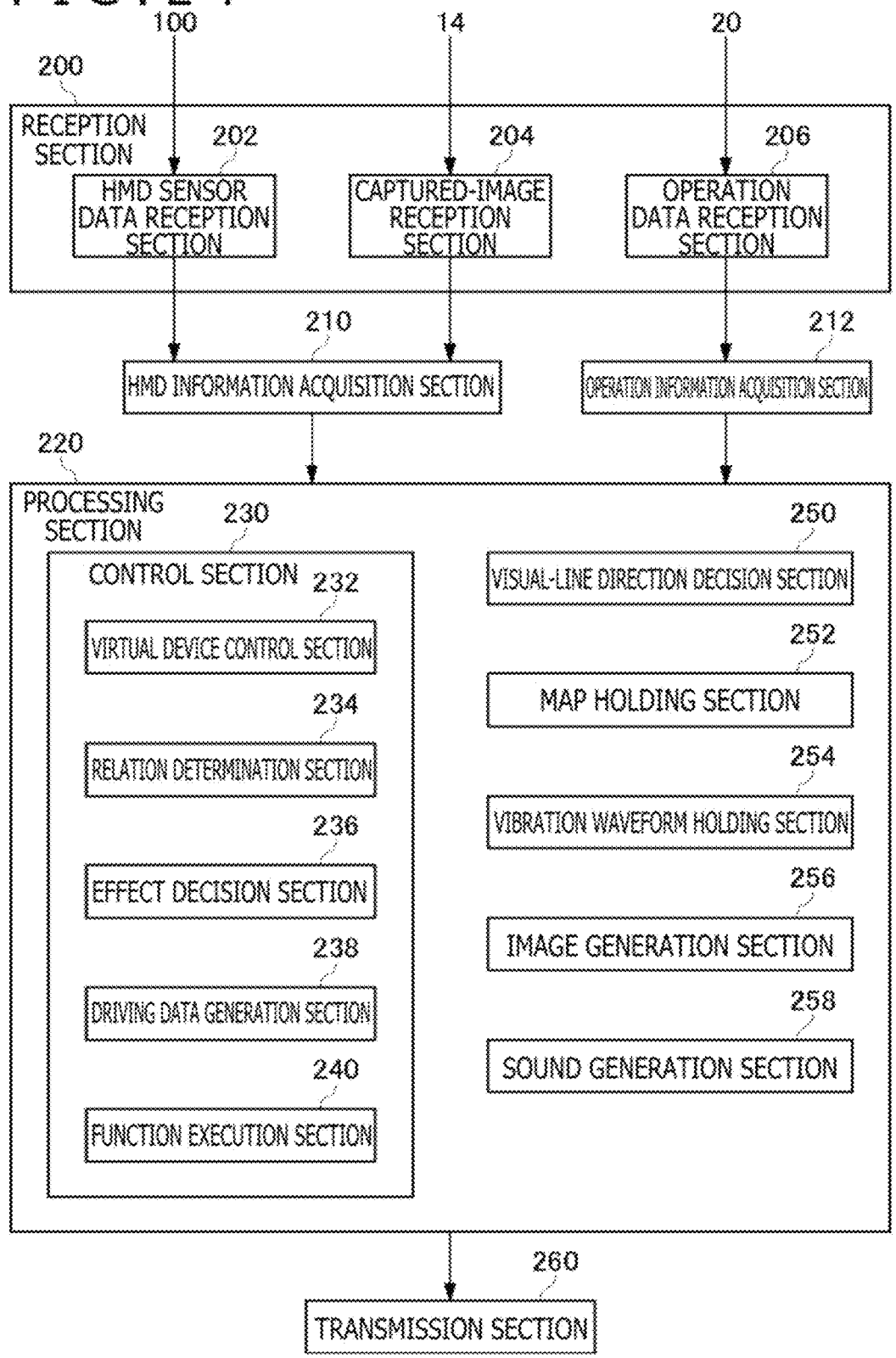
FIG. 24 is a diagram illustrating functional blocks of the information processing apparatus.

FIG. 24 illustrates another example of the functional blocks of the information processing apparatus 10. The information processing apparatus 10 includes, as input/output interfaces to the outside, the reception section 200 and the transmission section 260. The reception section 200 includes the HMD sensor data reception section 202, the captured-image reception section 204, and the operation data reception section 206. The information processing apparatus 10 further includes the HMD information acquisition section 210, the operation information acquisition section 212, and the processing section 220. The processing section 220 includes the control section 230, the visual-line direction decision section 250, the map holding section 252, the vibration waveform holding section 254, the image generation section 256, and the sound generation section 258. The control section 230 includes the virtual device control section 232, the relation determination section 234, the effect decision section 236, the driving data generation section 238, and a function execution section 240.

The information processing apparatus 10 includes a computer. The computer executes a program to implement the various functions illustrated in FIG. 24. The computer includes, as hardware, a memory for loading a program thereinto, one or more processors that execute a loaded program, an auxiliary storage, any other LSI, and the like. Each of the processors includes a plurality of electronic circuits including a semiconductor integrated circuit and LSI. The plurality of electronic circuits may be mounted on one chip or may be mounted on two or more chips. The functional blocks in FIG. 24 are implemented by cooperation between hardware and software. Therefore, those skilled in the art will understand that these functional blocks can be implemented in many different ways by hardware only, by software only, or a combination thereof.

A functional block in FIG. 24 denoted by a reference sign same as that of a functional block in FIG. 9 has a function identical or similar to that of the functional block in FIG. 9. Therefore, an explanation of a functional block denoted by a reference sign same as that of a functional block in FIG. 9 will be omitted as appropriate.

The operation data reception section 206 receives, in a predetermined cycle, sensor data obtained by the posture sensor 54 of the operation apparatus 400 being held by the user. In addition, the operation data reception section 206 receives operation data of the operation button 407 of the operation apparatus 400 being held by the user. The operation data reception section 206 supplies the sensor data obtained by the posture sensor 54 and the operation data of the operation button 407 to the operation information acquisition section 212.

In the second embodiment, the movable section 403 of the operation apparatus 400 has a function of presenting a kinesthetic sense to the user's hand, and further has a function of allowing the user to input operation information for executing a predetermined function to the application, by being moved by the user. That is, the movable section 403 has an input device function of inputting operation information. The operation data reception section 206 receives operation information indicating that the movable section 403 has been moved by the user's hand, and then supplies the operation information to the operation information acquisition section 212.

The operation information acquisition section 212 acquires, from the sensor data from the operation apparatus 400, posture information indicating the posture of the operation apparatus 400 and position information indicating the position of the operation apparatus 400 in the real space. The operation information acquisition section 212 calculates the posture information associated with the operation apparatus 400 by mainly using the sensor data obtained by the triaxial gyro sensor and calculates the position information associated with the operation apparatus 400 by using the sensor data obtained by the triaxial acceleration sensor. The posture information and the position information associated with the operation apparatus 400 constitute operation information indicating movement of the operation apparatus 400. The operation information acquisition section 212 supplies, as the operation information indicating movement of the operation apparatus 400, the posture information and the position information associated with the operation apparatus 400 to the processing section 220. In addition, the operation information acquisition section 212 supplies operation data of the operation button 407 and the operation information of the movable section 403 to the processing section 220.

The virtual device control section 232 controls movement of the virtual device 22 in the virtual space according to the operation information indicating the movement of the operation apparatus 400. Specifically, the virtual device control section 232 cyclically acquires the posture information and the position information associated with the operation apparatus 400 from the operation information acquisition section 212, determines the posture and the position of the virtual device 22 in the virtual space according to the posture information and the position information associated with the operation apparatus 400, and moves the virtual device 22 in the virtual space in a manner linked to the movement of the operation apparatus 400 in the real space.

It is to be noted that the virtual device control section 232 may determine the position or the posture of the virtual device 22 in the virtual space according to the position information or the posture information associated with the operation apparatus 400. That is, the virtual device control section 232 may link the position of the virtual device 22 in the virtual space to the position of the operation apparatus 400 in the real space or may link the posture of the virtual device 22 in the virtual space to the posture of the operation apparatus 400 in the real space.

In the rendering application according to the second embodiment, the user moves the operation apparatus 400 while depressing the operation button 407, whereby a track of the pen tip of the virtual device 22 corresponding to the tip of the operation apparatus 400 is rendered in the virtual space. When the user cancels the depression of the operation button 407, rendering of the track of the pen tip is finished.

<Scene in Which a Line is Drawn in a Space>

Figure 25:
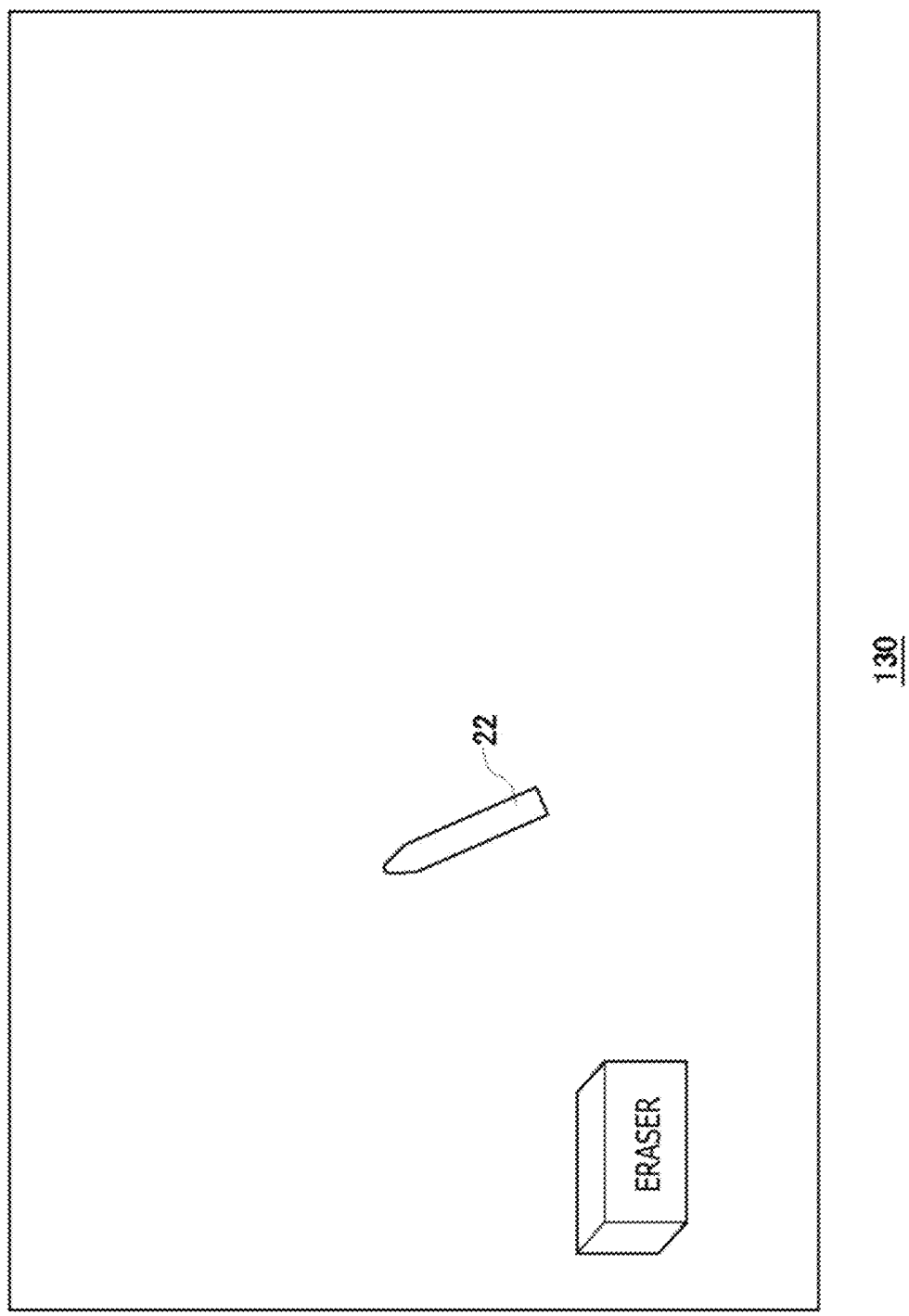
FIG. 25 is a diagram illustrating an example of an application screen.

FIG. 25 illustrates an example of a rendering application screen displayed on the display panel 130 of the HMD 100. On this application screen, a virtual object (eraser) for erasing an object drawn by the user is disposed at a lower left corner. First, the user puts the pen tip of the virtual device 22 to a rendering start position.

Figure 26:
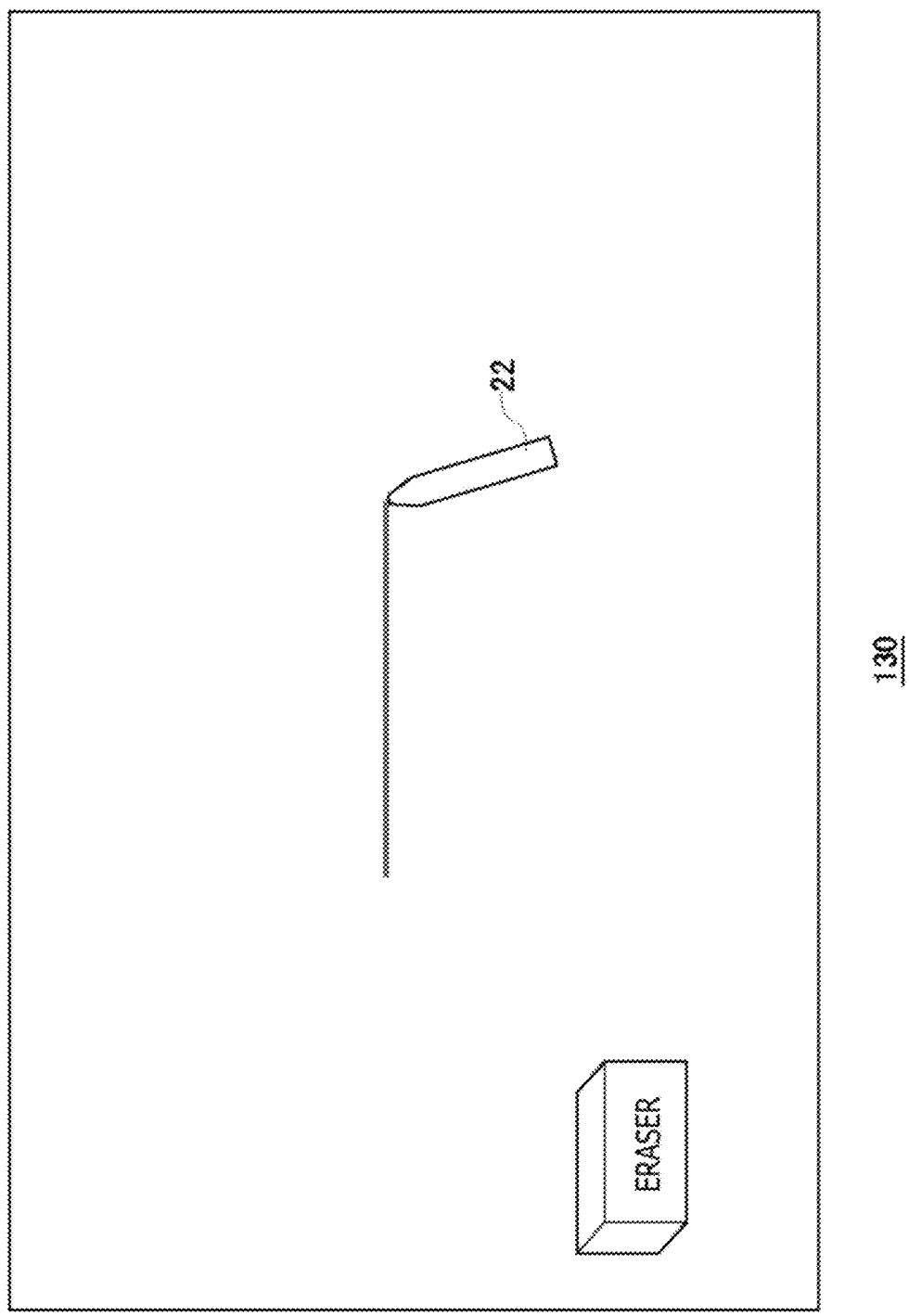
FIG. 26 is a diagram illustrating an example of an application screen.

FIG. 26 illustrates an example of the rendering application screen. When the user moves the operation apparatus 400 in the real space while pressing down the operation button 407, a track of the pen tip of the virtual device 22 corresponding to the tip end of the operation apparatus 400 is drawn in the virtual space. In this scene, the relation determination section 234 determines the moving speed of the virtual device 22, and the effect decision section 236 decides an effect to be exhibited to the operation apparatus 400, on the basis of the moving speed determined by the relation determination section 234.

The relation determination section 234 determines the moving speed of the virtual device 22 on the basis of the moving speed of the operation apparatus 400 in which the operation button 407 is being depressed. The effect decision section 236 derives a vibration profile of the vibration section 408 which is the tactile sense presentation section on the basis of the moving speed of the virtual device 22. As previously explained, the vibration profile may be defined by a vibration waveform and a vibration amount. The driving data generation section 238 generates second driving data for driving the vibration section 408, on the basis of the vibration profile. As previously explained in the first embodiment, the driving data generation section 238 may generate the second driving data on the basis of the vibration waveform and the vibration amount corresponding to the color of the line. When the user quits depressing the operation button 407, the rendering application stops rendering the track of the pen tip.

Figure 27:
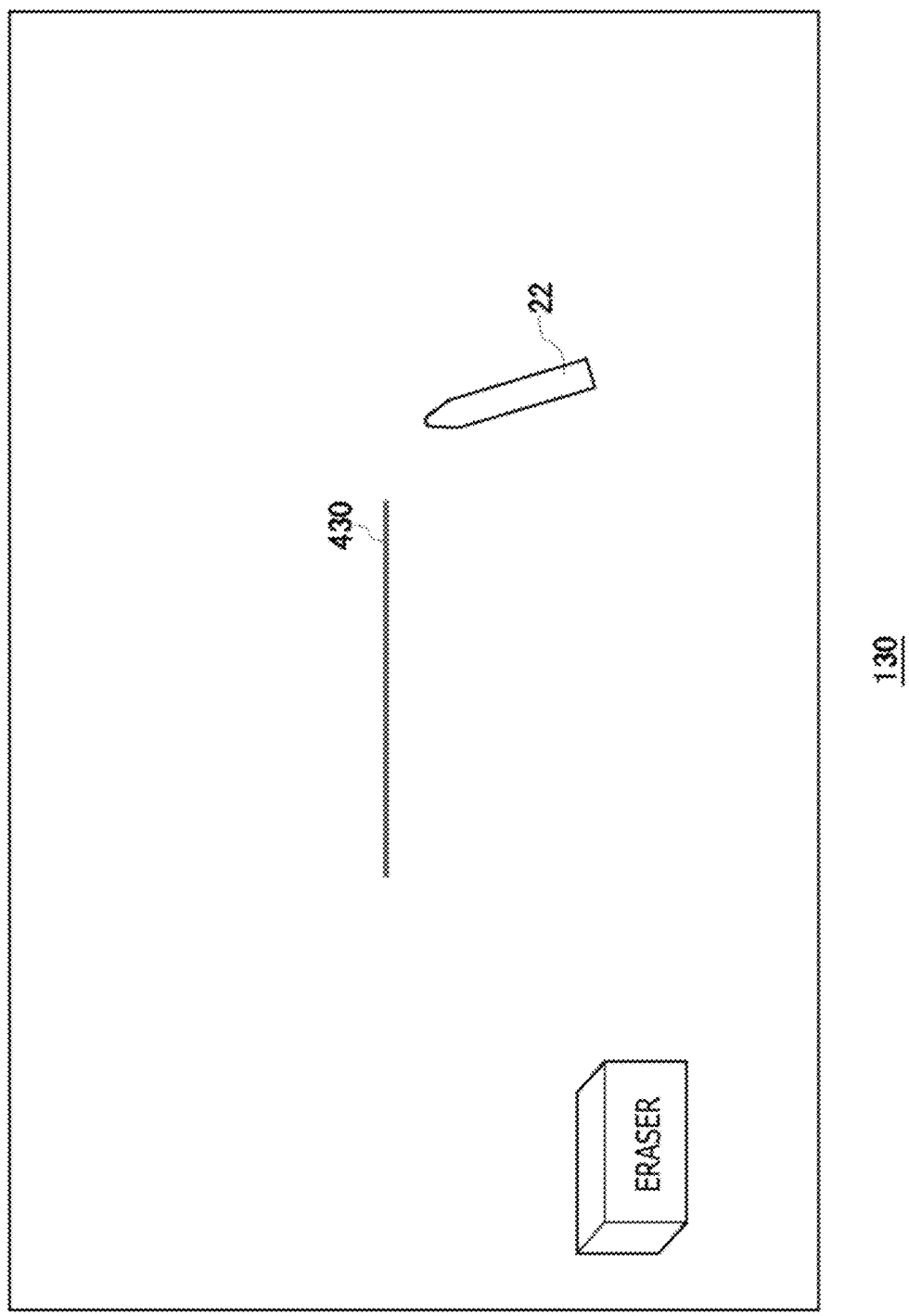
FIG. 27 is a diagram illustrating an example of an application screen.

FIG. 27 illustrates an example of the rendering application screen. When depression of the operation button 407 is quitted, the rendering application stops rendering the track of the pen tip in the virtual space. The example illustrated in FIG. 27 indicates a situation in which drawing of a line 430 is finished after the user quits operating the operation button 407.

<Scene of Drawing a Plane One Side of Which is a Drawn Line>

In the rendering application according to the second embodiment, when the drawn line 430 is designated by the pen tip and the pen tip is moved, the line shape is expanded to the moving direction of the pen tip.

Figure 28:
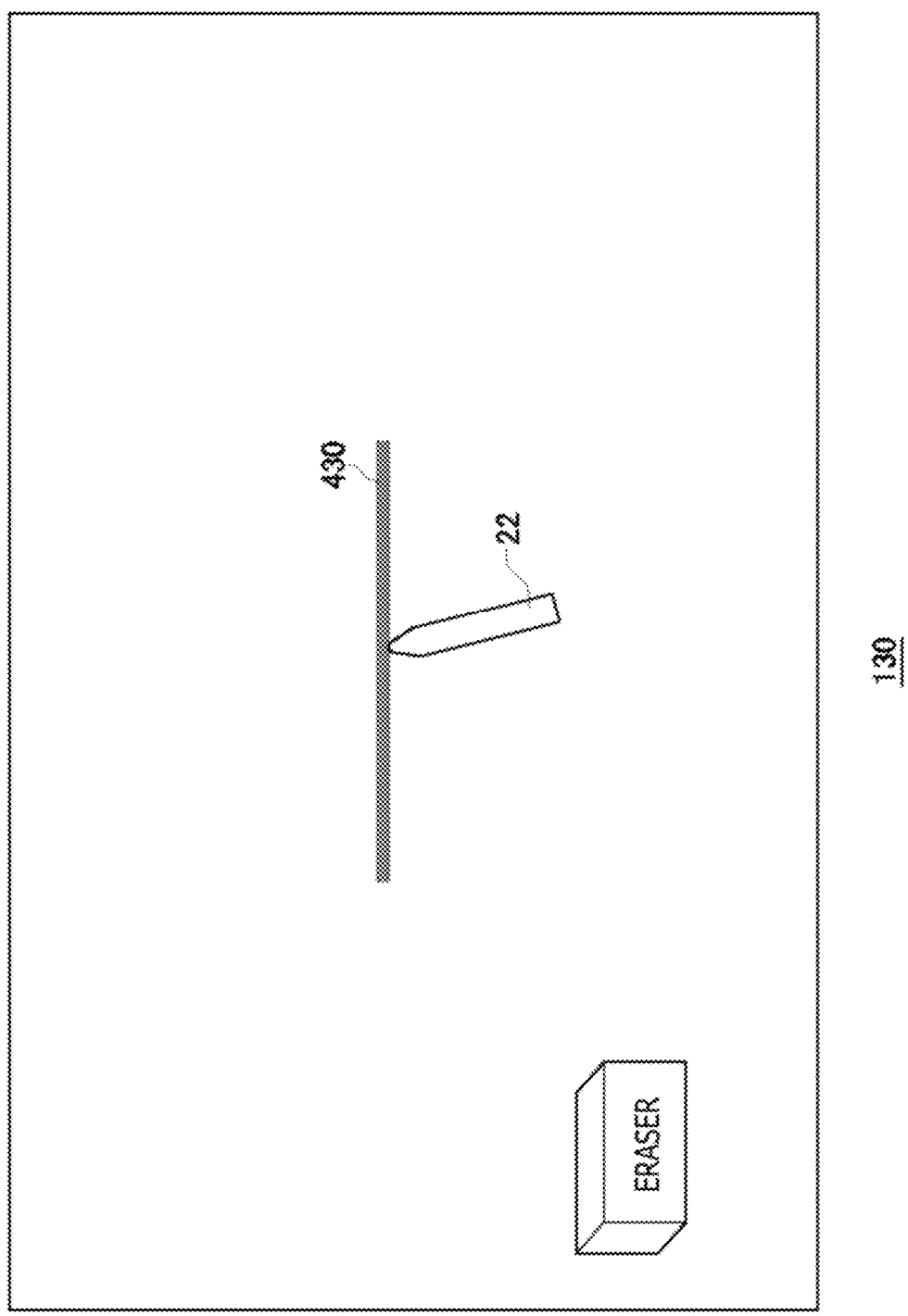
FIG. 28 is a diagram illustrating an example of an application screen.

FIG. 28 illustrates a situation in which the drawn line has been designated by the pen tip. The line 430 is designated by the pen tip of the virtual device 22 being put on the line 430. In the rendering application, when the line 430 is designated, the designated line 430 may be indicated in bold or in a different color such that the user is notified of completion of designation of the line 430.

Figure 29:
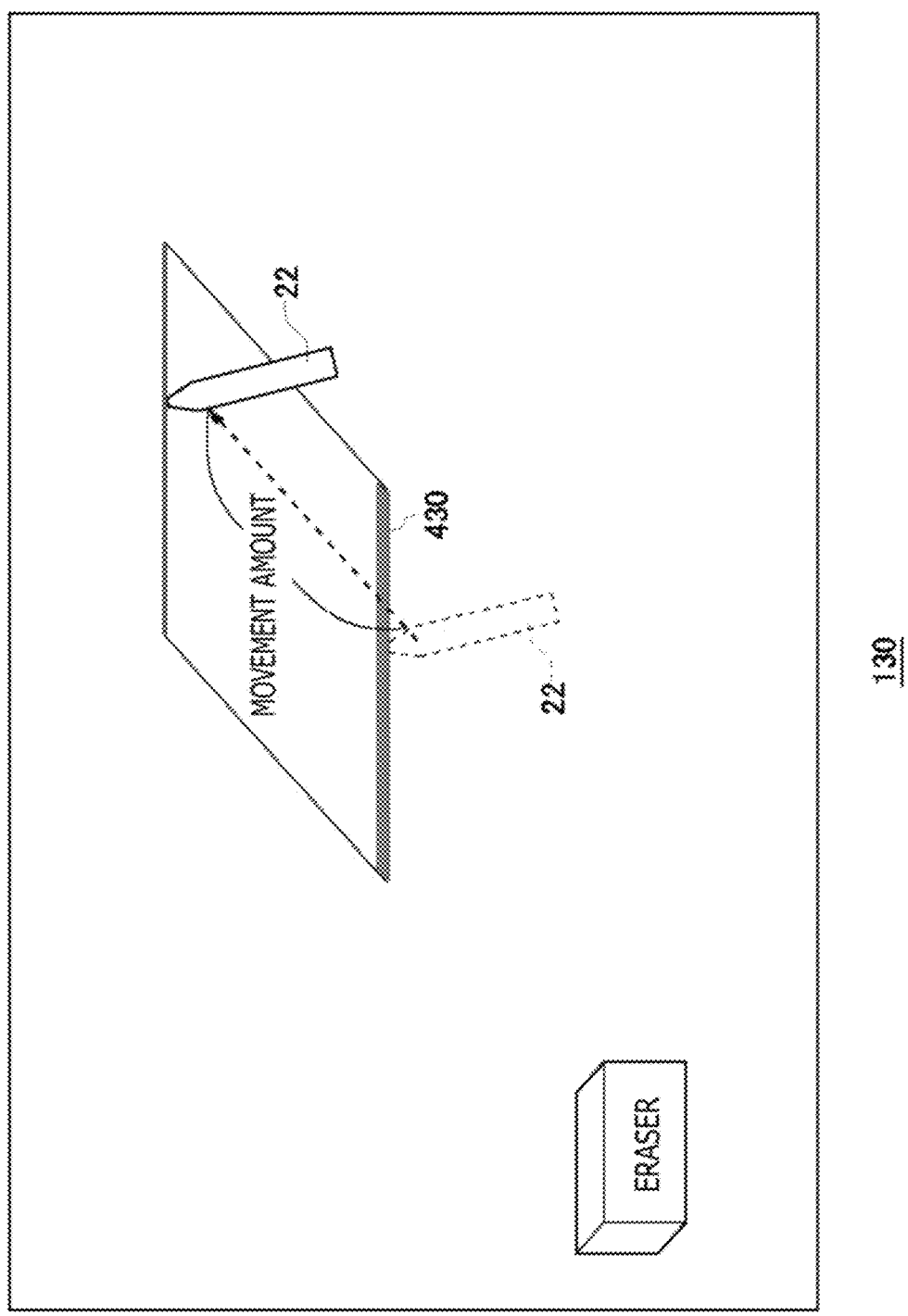
FIG. 29 is a diagram illustrating an example of an application screen.

FIG. 29 illustrates a situation in which the line shape has been expanded to the moving direction of the pen tip. When the user moves the operation apparatus 400 while pressing down the operation button 407, the line shape of the line 430 is expanded to the moving direction of the pen tip in the virtual space. The line 430 is a straight line in this example, but, if the line 430 is a curved line, a plane formed by expanding the curved shape to the moving direction of the pen tip is drawn.

The effect decision section 236 derives the moving direction and the movement amount of the movable section 403 which is the kinesthetic sense presentation section on the basis of the movement of the virtual device 22 expanding the line shape. Specifically, when the shape of the line 430 is expanded by the virtual device 22, the effect decision section 236 derives the moving direction (rotating direction) of the movable section 403 on the basis of the expansion direction and derives the movement amount (rotating amount) of the movable section 403 in this rotating direction on the basis of the length of the expansion. When the line shape of the line 430 is expanded to the right direction from its initial position, the effect decision section 236 decides to rotate the movable section 403 to a direction opposite to the right direction in which the pen tip moves (that is, a left rotating direction when viewed from the user visual point, or a right rotating direction when the operation apparatus 400 is viewed from the front side (the rotating direction indicated in FIG. 22(c))). When the line shape of the line 430 is expanded to the left direction from its initial position, on the other hand, the effect decision section 236 decides to rotate the movable section 403 to a direction opposite to the left direction in which the pen tip moves (that is, a right rotating direction when viewed from the user visual point, or a left rotating direction when the operation apparatus 400 is viewed from the front side (the rotating direction indicated in FIG. 22(b))).

In the example illustrated in FIG. 29, the effect decision section 236 decides to rotate the movable section 403 in the right rotating direction when the operation apparatus 400 is viewed from the front side, because the virtual device 22 is moved to the right direction. In addition, the effect decision section 236 decides the rotating amount of the movable section 403 according to the movement amount of the virtual device 22. The map holding section 252 holds a map defining a relation between the movement amount of the virtual device 22 and the rotating amount of the movable section 403, as indicated in FIG. 12. In reference to this map, the effect decision section 236 may acquire the rotating amount of the movable section 403 corresponding to the movement amount of the virtual device 22. The effect decision section 236 supplies the decided rotating direction and the decided rotating amount to the driving data generation section 238. The driving data generation section 238 generates first driving data for driving the second rotary actuator 410, on the basis of the rotating direction and the rotating amount.

The transmission section 260 transmits the first driving data generated by the driving data generation section 238 to the operation apparatus 400. In the operation apparatus 400, the control section 450 drives the second rotary actuator 410 to rotate the movable section 403, in reference to the first driving data. Accordingly, the movable section 403 is rotated to the rotating direction and by the rotating amount corresponding to the moving direction and the movement amount of the virtual device 22. In this regard, the second rotational angle sensor 418 detects the rotational angle of the second rotary actuator 410, and rotation of the movable section 403 is controlled on the basis of a detection value obtained by the second rotational angle sensor 418.

In the example illustrated in FIG. 29, a kinesthetic sense in the left rotating direction, when viewed from the user visual point, is presented to the index finger of the user through the movable section 403. This kinesthetic sense in the left rotating direction corresponds to a frictional force that acts on the pen tip in response to the rightward movement of the operation apparatus 400. Therefore, the user can physically feel that the user is creating a plane by expanding the line shape.

In the second embodiment, the movable section 403 not only presents a kinesthetic sense to the user but also functions as an input device through which the user performs an operation input in the application. The control section 450 detects that the index finger of the user has rotated the movable section 403, by monitoring the angle being detected by the second rotational angle sensor 418. Then, the control section 450 causes the communication control section 56 to transmit operation information indicating that the movable section 403 has been moved by the user's hand, to the information processing apparatus 10.

For example, it is assumed that the movable section 403 that is in the reference posture in which the rotating angle is 0 degrees as illustrated in FIG. 22(a) is rotated by α degrees to the right rotating direction when viewed from the front side, in reference to the first driving data generated by the information processing apparatus 10. In this case, the second rotational angle sensor 418 detects the rotational angle of +α degrees, and the control section 450 controls the second rotary actuator 410 in such a manner as to maintain the rotational angle of +α degrees.

In this state, the index finger of the user rotates the movable section 403 in such a manner that the rotational angle of the movable section 403 is deviated from +α degrees. At this time, the control section 450 receives, as operation information to the application, this movement of the movable section 403 on the basis of the detection value obtained by the second rotational angle sensor 418. It is to be noted that the control section 450 may receive, as operation information to the application, the movement of the movable section 403 in a case where the rotational angle of the movable section 403 has been an angle deviated from +α degrees for a predetermined time period (e.g., one second). After receiving the operation information indicating that the movable section 403 has been moved by the user's hand, the control section 450 causes the communication control section 56 to transmit the operation information to the information processing apparatus 10. This operation information may include the direction in which the movable section 403 has been moved by the user's hand.

In a case where the second rotational angle sensor 418 detects an angle of (α-β), the control section 450 determines that the user has rotated the movable section 403 by β degrees to the left rotating direction when viewed from the front side. That is, the control section 450 determines that the user has rotated the movable section 403 to a direction opposite to the direction in which the movable section 403 has been moved in reference to the first driving data (the direction in which the kinesthetic sense has been given). In a case where the second rotational angle sensor 418 detects an angle of (α+β), on the other hand, the control section 450 determines that the user has rotated the movable section 403 by β degrees to the right rotating direction when viewed from the front side. That is, the control section 450 determines that the user has rotated the movable section 403 to a direction identical to the direction in which the movable section 403 has been moved in reference to the first driving data (the direction in which the kinesthetic sense has been given). The control section 450 causes the communication control section 56 to transmit the operation information indicating the direction in which the movable section 403 has been moved by the user's hand, to the information processing apparatus 10.

In the information processing apparatus 10, when the operation information acquisition section 212 acquires the operation information indicating that the movable section 403 has been moved by the user's hand, this operation information is provided to the control section 230. In the control section 230, the function execution section 240 causes an application function corresponding to this operation information to be executed in the virtual space.

Figure 30:
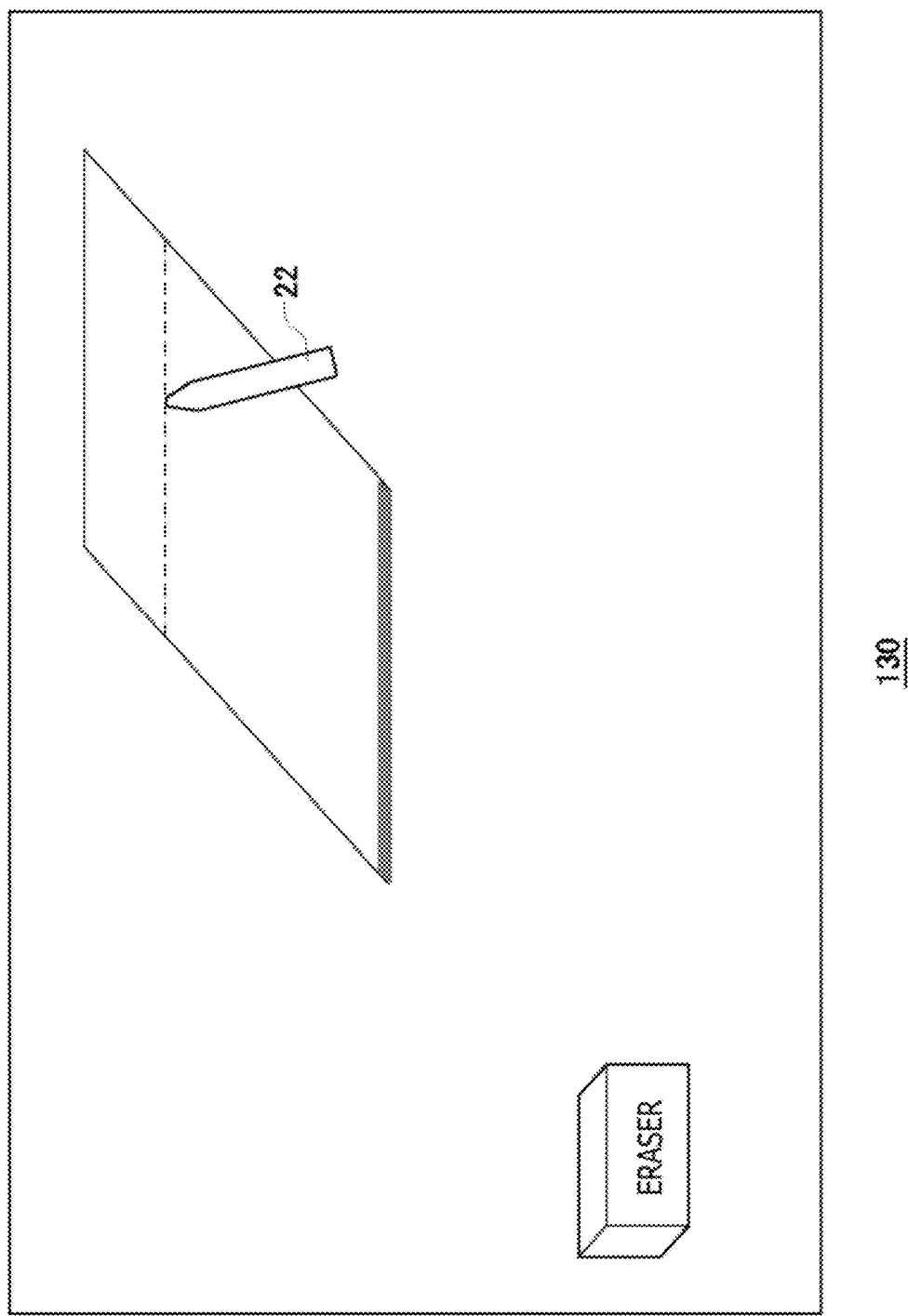
FIG. 30 is a diagram illustrating an example of an application screen.

FIG. 30 indicates a situation in which the line shape has been further expanded beyond the pen tip. In a case where the operation information indicates that the movable section 403 has been moved by the user's hand to a direction different from the direction in which the movable section 403 has been moved in reference to driving data, the function execution section 240 executes a function of further expanding the line shape beyond the pen tip. As a result, the plane created by expanding the line shape is further enlarged toward the moving direction of the pen tip. It is to be noted that, since an upper limit is set on a stroke amount in the rotating direction of the movable section 403, the user is liable to move the movable section 403 in a direction opposite to the direction in which the movable section 403 has been moved in reference to the driving data. Hence, it is effective to allocate an application function to an event in which the user moves the movable section 403 in a direction opposite to the direction in which the movable section 403 has been moved in reference to the driving data, because a sufficient stroke amount can be ensured in the structure of the movable section 403.

It is to be noted that, in a case where the operation information indicates that the movable section 403 has been moved by the user's hand to a direction identical to the direction in which the movable section 403 has been moved in reference to the driving data, the function execution section 240 may execute a function of setting the expansion amount of the line shape to be short so as not to reach the position of the pen tip. In the rendering application according to the second embodiment, the user can adjust the expansion amount of the line shape by moving the pen tip of the virtual device 22. Besides, the user also can adjust the expansion amount by rotating the movable section 403. Therefore, it is easy to finely adjust the expansion amount.

It is to be noted that the operation information acquisition section 212 acquires the operation information indicating that the movable section 403 has been moved by the user's hand, while the movable section 403 is presenting a kinesthetic sense to the user's hand, and the function execution section 240 executes a function corresponding to this operation information in the virtual space while the movable section 403 is presenting a kinesthetic sense to the user's hand. Accordingly, the control section 230 can use, as user's operation information of the movable section 403, a displacement from the rotating amount (+α degrees) of the second rotary actuator 410 in reference to the first driving data.

In the rendering application according to the second embodiment, the user can delete a drawn object from the screen by performing an operation on the eraser, which is disposed at the lower left corner of the screen, by using the movable section 403.

<Scene in Which a Drawn Object is Deleted>

Figure 31:
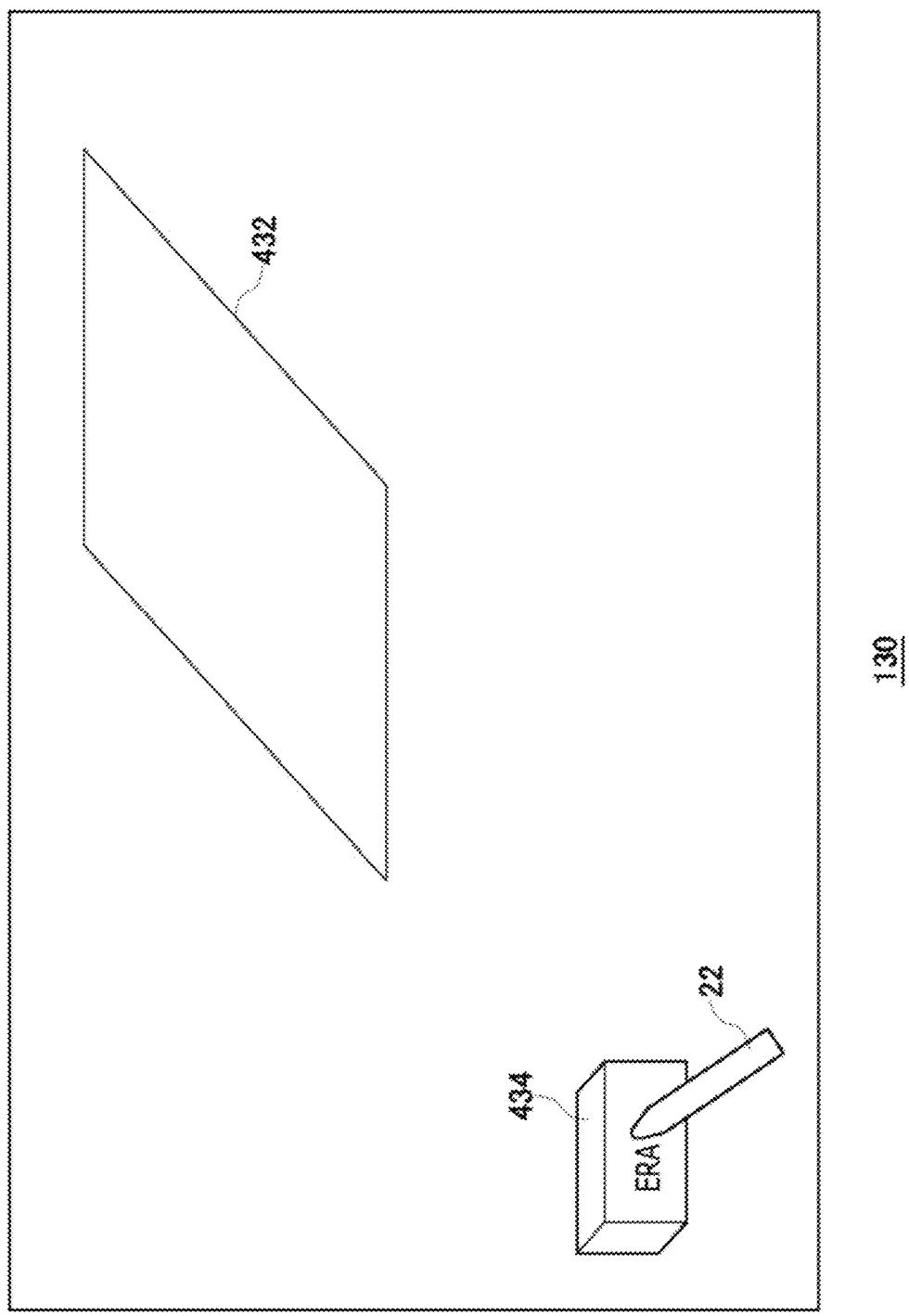
FIG. 31 is a diagram illustrating an example of an application screen.

FIG. 31 illustrates a situation in which the pen tip of the virtual device 22 is brought into contact with an object (eraser). The relation determination section 234 determines a relative relation between the virtual device 22 and an eraser 434 which is a virtual object. The effect decision section 236 decides an effect to be exhibited to the operation apparatus 400, on the basis of the relative relation determined by the relation determination section 234.

The relation determination section 234 determines a positional relation between the virtual device 22 and the eraser 434 which is disposed at a predetermined position, on the basis of the 3D coordinates of the eraser 434 and the 3D coordinates of the virtual device 22. In the second embodiment, the relation determination section 234 derives the length by which the virtual device 22 is pressed into the eraser 434, on the basis of the determined positional relation. When the virtual device 22 is pressed into the eraser 434, the effect decision section 236 decides to move the movable section 403 which is the kinesthetic sense presentation section in such a direction as to be drawn into the base body 402. In this case, the effect decision section 236 may derive the movement amount of the movable section 403 which is the kinesthetic sense presentation section on the basis of the pressing length. The driving data generation section 238 generates first driving data for driving the first rotary actuator 310, on the basis of the movement amount.

The transmission section 260 transmits the first driving data generated by the driving data generation section 238 to the operation apparatus 400. In the operation apparatus 400, the control section 450 drives the first rotary actuator 310 to move the movable section 403, in reference to the first driving data. In this regard, the first rotational angle sensor 322 detects the rotational angle of the first rotary actuator 310, and movement of the movable section 403 is controlled on the basis of a detection value obtained by the first rotational angle sensor 322. Through a kinesthetic sense presented by the movable section 403, the user can feel that the virtual device 22 is in contact with the eraser 434.

In the example illustrated in FIG. 31, the movable section 403 presents a kinesthetic sense to the index finger of the user in a pressing direction of the pen tip. When the index finger of the user pushes back the movable section 403 in this state, the control section 450 acquires the movement amount of the user's index finger pushing back the movable section 403, from the angle detected by the first rotational angle sensor 322, and causes the communication control section 56 to transmit operation information indicating that the movable section 403 has been moved by the user's hand, to the information processing apparatus 10.

For example, it is assumed that the movable section 403 has been moved from the reference position by a drawing amount A, in reference to the first driving data generated by the information processing apparatus 10. In this case, the first rotational angle sensor 322 detects the rotational angle of "a" degrees of the first rotary actuator 310, which corresponds to the drawing amount A, and the control section 450 controls the first rotary actuator 310 in such a manner as to maintain the rotational angle of "a" degrees of the first rotary actuator 310.

In this state, the user's index finger moves the movable section 403 in a sliding direction in such a way that the drawing amount is deviated from the drawing amount A. At this time, the control section 450 receives, as operation information to the application, this movement of the movable section 403 on the basis of the detection value obtained by the first rotational angle sensor 322. Specifically, the control section 450 receives operation information indicating that the movable section 403 has been moved by the user's hand, and causes the communication control section 56 to transmit the operation information to the information processing apparatus 10. This operation information may include the movement amount by which the movable section 403 has been moved by the user's hand.

In a case where the second rotational angle sensor 418 detects an angle of (a-b), the control section 450 determines that the user has moved the movable section 403 by the movement amount corresponding to the detected angle b in a direction of pushing back the movable section 403. That is, the control section 450 determines that the user has moved the movable section 403 in a direction opposite to the direction in which the movable section 403 has been moved in reference to the first driving data (the direction in which the kinesthetic sense has been given). It is to be noted that, in a case where the rotational angle of the first rotary actuator 310 has been an angle deviated from "a" degrees for a predetermined time period (e.g., one second), the control section 450 may receive, as operation information to the application, the movement of the movable section 403. The control section 450 causes the communication control section 56 to transmit the operation information indicating that the movable section 403 has been moved by the user's hand, to the information processing apparatus 10.

In the information processing apparatus 10, the operation information acquisition section 212 acquires the operation information indicating that the movable section 403 has been moved by the user's hand, and provides this operation information to the control section 230. In the control section 230, the function execution section 240 causes a function corresponding to this operation information to be executed in the virtual space. In this example, the function execution section 240 executes a function of deleting a drawn object 432. Thus, the drawn object 432 is deleted.

Figure 32:
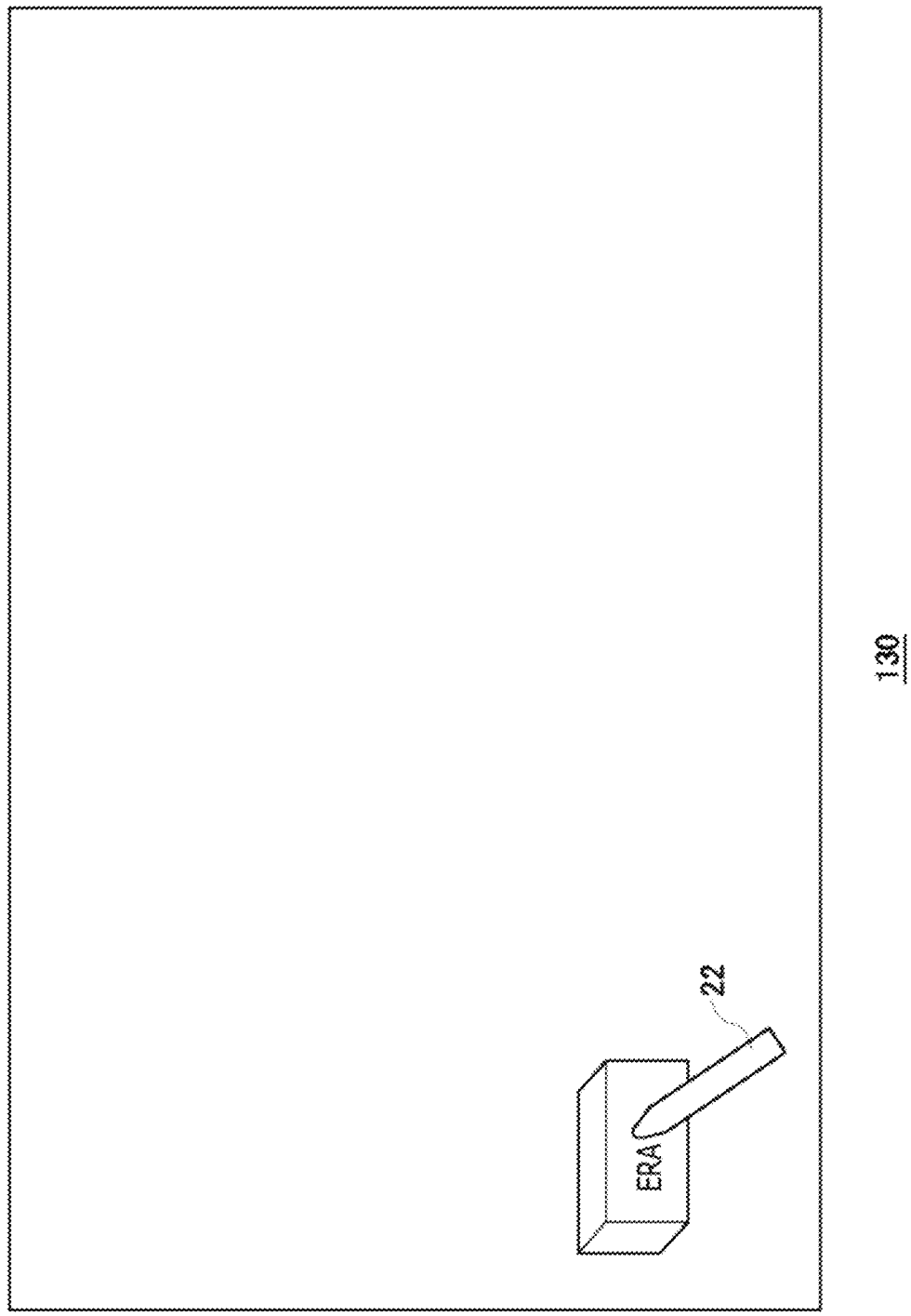
FIG. 32 is a diagram illustrating an example of an application screen.

FIG. 32 illustrates a situation in which the drawn object 432 has been deleted. In this manner, on the basis of the operation information indicating that the user has operated the movable section 403, the function execution section 240 executes the application function allocated to this operation information. Consequently, a user's intention of executing the function can be properly reflected.

The present invention has been explained on the basis of the embodiments. The embodiments exemplify the present invention, and those skilled in the art will understand that various modifications can be made to combine the constituent elements or the process steps of the embodiments, and that these modifications are also within the scope of the present invention. In the embodiments described above, the control section 230 executes a VR application. However, an application other than VR applications may be executed.

In the embodiments, the effect decision section 236 derives a vibration profile, and the driving data generation section 238 generates the second driving data according to the vibration profile. In a modification, the effect decision section 236 may apply the scheme of deriving a vibration profile also to a sound effect such that the sound generation section 258 generates sound in synchronization with tactile feedback.

INDUSTRIAL APPLICABILITY

The present invention is applicable to a technology for providing kinesthetic feedback and/or tactile feedback to a user.

REFERENCE SIGNS LIST

1: Information processing system
10: Information processing apparatus
20: Operation apparatus
22: Virtual device
30: Base body 32: Movable section
34: Finger engagement section
34a: Curved surface
36: Finger placement section
40: Vibration section
42: Operation button
50: Control section
52: Storage section
54: Posture sensor
56: Communication control section
100: HMD
102: Output mechanism part
104: Fitting mechanism part
106: Fitting band
108: Casing
110: Light emitting marker
120: Control section
122: Storage section
124: Posture sensor
126: Microphone
128: Communication control section
130: Display panel
130a: Left-eye display panel
130b: Right-eye display panel
132: Sound output section
200: Reception section
202: HMD sensor data reception section
204: Captured-image reception section
206: Operation data reception section
210: HMD information acquisition section
212: Operation information acquisition section
220: Processing section
230: Control section
232: Virtual device control section
234: Relation determination section
236: Effect decision section
238: Driving data generation section
240: Function execution section
250: Visual-line direction decision section
252: Map holding section
254: Vibration waveform holding section
256: Image generation section
258: Sound generation section
260: Transmission section
300: Movement mechanism
310: First rotary actuator
312: Feed screw
314: Nut
316: Guide mechanism
318: Rod
320: Fixation section
322: First rotational angle sensor
400: Operation apparatus
402: Base body
403: Movable section
404: Finger engagement section
404a: Curved surface
405: Finger placement section
406: Switch-equipped member
407: Operation button
408: Vibration section
410: Second rotary actuator
412: Support frame
414: Base section
416: Stopper
418: Second rotational angle sensor
420: Movement mechanism
422: Fixed section
450: Control section

The invention claimed is:

1. An information processing apparatus comprising:
at least one processor having hardware,
a non-transitory memory containing instructions when executed by the processor causes the processor to perform the steps of:
acquiring first operation information indicating movement of an operation apparatus that is held by a user's hand and includes a kinesthetic sense presentation section that presents a kinesthetic sense to the user's hand,
controlling movement of a virtual device corresponding to the operation apparatus in a virtual space according to the first operation information,
generating driving data for driving the kinesthetic sense presentation section on a basis of the movement of the virtual device,
acquiring second operation information indicating that the kinesthetic sense presentation section has been moved by the user's hand, and
executing a function corresponding to the second operation information in the virtual space.

2. The information processing apparatus according to claim 1, wherein the second operation information includes a direction in which the kinesthetic sense presentation section has been moved by the user's hand.

3. The information processing apparatus according to claim 2, wherein the second operation information indicates that the kinesthetic sense presentation section has been moved by the user's hand in a direction different from a direction in which the kinesthetic sense presentation section has been moved in reference to the driving data.

4. The information processing apparatus according to claim 3, wherein the second operation information indicates that the kinesthetic sense presentation section has been moved by the user's hand in a direction opposite to the direction in which the kinesthetic sense presentation section has been moved in reference to the driving data.

5. The information processing apparatus according to claim 2, wherein the second operation information indicates that the kinesthetic sense presentation section has been moved by the user's hand in a direction identical to a direction in which the kinesthetic sense presentation section has been moved in reference to the driving data.

6. The information processing apparatus according to claim 1, wherein the at least one processor executes the function corresponding to the second operation information in the virtual space while the kinesthetic sense presentation section is presenting a kinesthetic sense to the user's hand.

7. An information processing method comprising:
Acquiring, by a processor, first operation information indicating movement of an operation apparatus that is held by a user's hand and includes a kinesthetic sense presentation section that presents a kinesthetic sense to the user's hand;
controlling, by the processor, movement of a virtual device corresponding to the operation apparatus in a virtual space according to the first operation information;
generating, by the processor, driving data for driving the kinesthetic sense presentation section on a basis of the movement of the virtual device;
acquiring, by the processor, second operation information indicating that the kinesthetic sense presentation section has been moved by the user's hand; and causing, by the processor, a function corresponding to the second operation information to be executed in the virtual space.

8. An information processing apparatus comprising:
at least one processor having hardware, wherein the at least one processor
a non-transitory memory containing instructions when executed by the processor causes the processor to perform the steps of:
acquiring operation information indicating movement of an operation apparatus that is held by a user's hand and includes a kinesthetic sense presentation section that presents a kinesthetic sense to a first finger of the user and a tactile sense presentation section that presents a tactile sense to a second finger of the user,
controling movement of a virtual device corresponding to the operation apparatus in a space where a virtual object exists, according to the operation information, and
generating first driving data for driving the kinesthetic sense presentation section and second driving data for driving the tactile sense presentation section, on a basis of a relation between the virtual device and the virtual object.

9. The information processing apparatus according to claim 8, wherein the kinesthetic sense presentation section is a movable section that moves relative to a base body of the operation apparatus, and the tactile sense presentation section is a vibration section that generates vibration.

10. The information processing apparatus according to claim 8, wherein the at least one processor generates the first driving data for driving the kinesthetic sense presentation section, on a basis of a positional relation between the virtual device and the virtual object.

11. The information processing apparatus according to claim 8, wherein the at least one processor generates the second driving data for driving the tactile sense presentation section, on a basis of a relative speed between the virtual device and the virtual object.

12. The information processing apparatus according to claim 11, wherein the at least one processor generates the second driving data for driving the tactile sense presentation section, on a basis of a vibration profile derived from a vibration waveform that is decided according to the virtual object and a vibration amount that is decided according to the relative speed between the virtual device and the virtual object.

13. A driving data generation method comprising:
Acquiring, by a processor, operation information indicating movement of an operation apparatus that is held by a user's hand and includes a kinesthetic sense presentation section that presents a kinesthetic sense to a first finger of the user and a tactile sense presentation section that presents a tactile sense to a second finger of the user;
Controlling, by the processor, movement of a virtual device corresponding to the operation apparatus in a space where a virtual object exists, according to the operation information; and
Generating, by the processor, first driving data for driving the kinesthetic sense presentation section and second driving data for driving the tactile sense presentation section, on a basis of a relation between the virtual device and the virtual object.

* * * * *